United States Patent [19]
Vilim et al.

[11] Patent Number: 5,745,382
[45] Date of Patent: Apr. 28, 1998

[54] NEURAL NETWORK BASED SYSTEM FOR EQUIPMENT SURVEILLANCE

[75] Inventors: Richard B. Vilim, Aurora; Kenneth C. Gross, Bolingbrook; Stephan W. Wegerich, Glendale Hts., all of Ill.

[73] Assignee: ARCH Development Corporation, Chicago, Ill.

[21] Appl. No.: 521,892

[22] Filed: Aug. 31, 1995

[51] Int. Cl.$^6$ .................................................. G06F 19/00
[52] U.S. Cl. ................... 364/551.01; 395/21; 395/23; 395/904; 395/906
[58] Field of Search ................ 128/695 R; 364/550, 364/551.01; 395/21, 23, 904, 906, 912, 914

[56] References Cited

U.S. PATENT DOCUMENTS

| | | | |
|---|---|---|---|
| 5,214,577 | 5/1993 | Sztipanovits et al. | 364/184 |
| 5,223,207 | 6/1993 | Gross et al. | 376/216 |
| 5,285,457 | 2/1994 | Funakubo et al. | 372/38 |
| 5,402,521 | 3/1995 | Niida et al. | 364/550 X |
| 5,410,492 | 4/1995 | Gross et al. | 376/216 X |
| 5,419,197 | 5/1995 | Ogi et al. | 364/550 X |
| 5,459,675 | 10/1995 | Gross et al. | 395/914 X |
| 5,463,768 | 10/1995 | Cuddihy et al. | 395/183.13 |
| 5,473,532 | 12/1995 | Unno et al. | 395/21 X |
| 5,524,631 | 6/1996 | Zahorian et al. | 128/698 |
| 5,623,579 | 4/1997 | Damiano et al. | 395/22 |
| 5,668,741 | 9/1997 | Prigent | 364/551.01 |
| 5,677,998 | 10/1997 | Buckley | 395/21 X |

OTHER PUBLICATIONS

Waibel, A., "Modular Construction of Time–Delay Neural Networks for Speech Recognition," in *Neural Computation*, vol. 1, No. 1, pp. 39 46, 1989.

Lippman, R.P. "Review of Neural Networks for Speech Recognition," in *Neural Computation*, vol. 1, No. 1, pp. 1–38, 1989.

Digital Neural Networks by S. Y. Kung, pertinent relevant exerpt portions (namely pp. 133–135, 138–139.

*Primary Examiner*—Edward R. Cosimano
*Attorney, Agent, or Firm*—Michael D. Rechtin; Foley & Lardner

[57] ABSTRACT

A method and system for performing surveillance of transient signals of an industrial device to ascertain the operating state. The method and system involves the steps of reading into a memory training data, determining neural network weighting values until achieving target outputs close to the neural network output. If the target outputs are inadequate, wavelet parameters are determined to yield neural network outputs close to the desired set of target outputs and then providing signals characteristic of an industrial process and comparing the neural network output to the industrial process signals to evaluate the operating state of the industrial process.

20 Claims, 16 Drawing Sheets

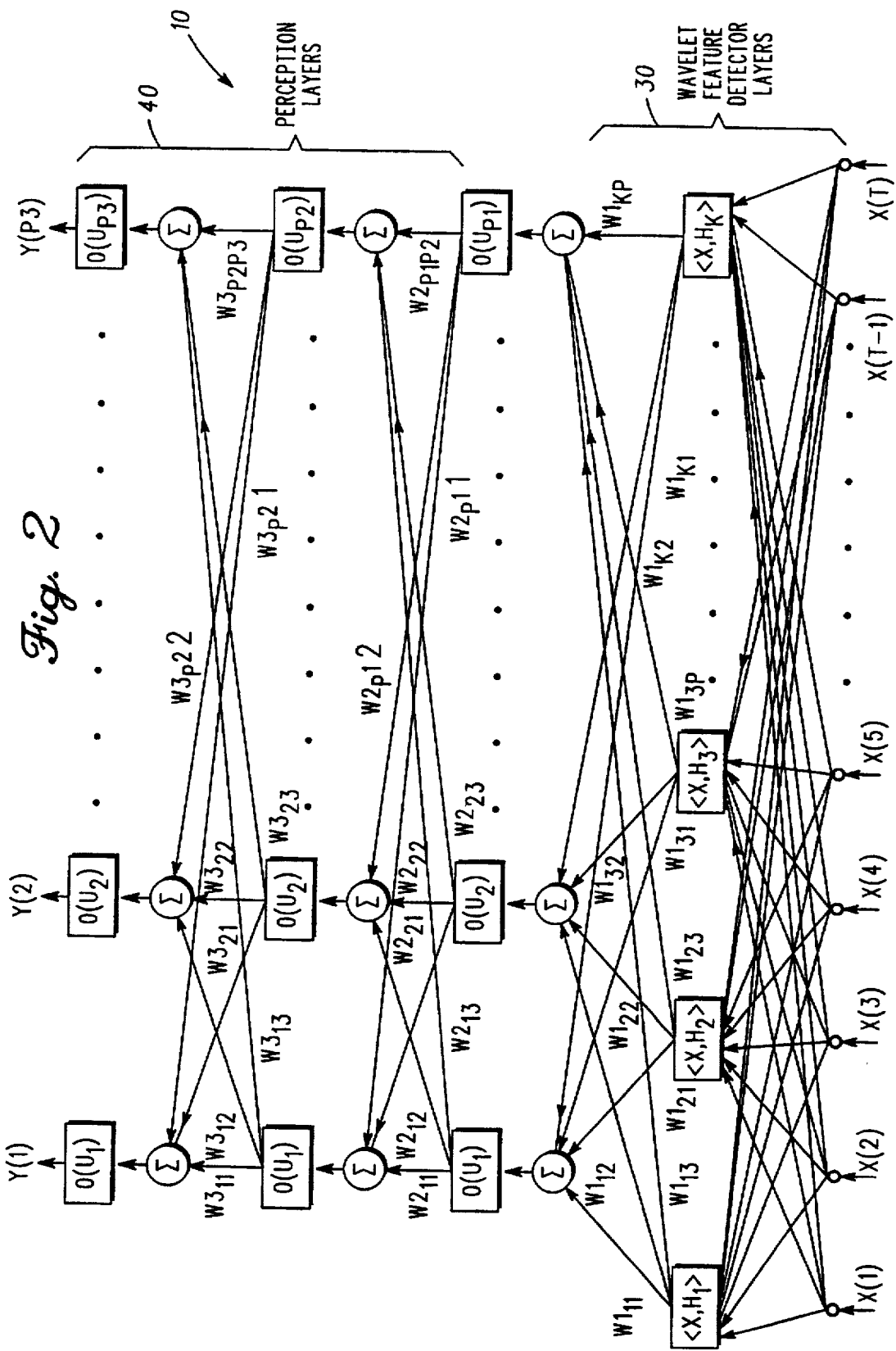

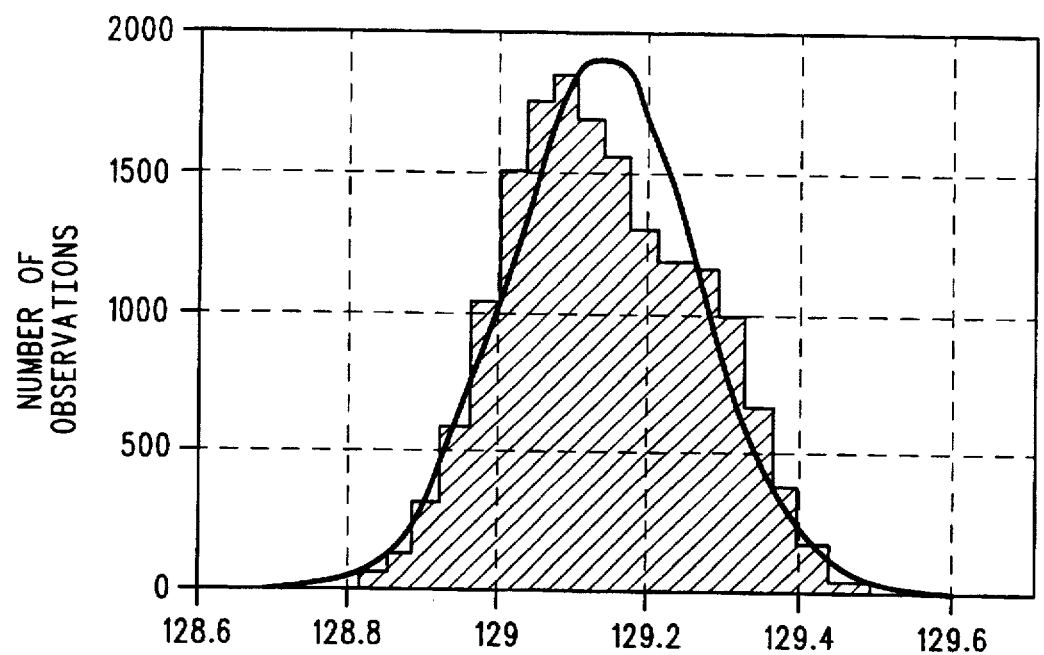
_Fig. 12A_
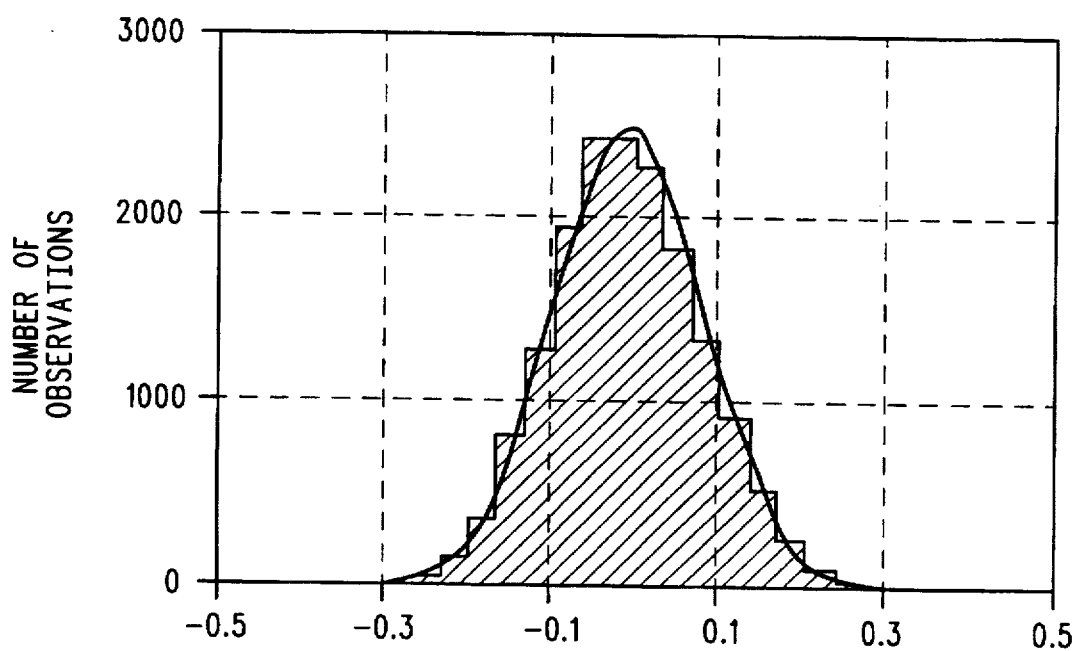
_Fig. 12B_

NEURAL NETWORK BASED SYSTEM FOR EQUIPMENT SURVEILLANCE

The invention was made with U.S. Government support under Contract No. W-31-109-ENG-38 awarded by the Department of Energy, and the U.S. Government has certain rights in this invention.

The present invention is directed generally to a method and apparatus for surveillance of the operating state of industrial devices. More particularly, the invention is concerned with monitoring an industrial device using a neural network methodology for optimal signal viewing and analysis. This methodology also includes monitoring transient phases, including repetitive transient phases, of industrial devices using the neural network and further involves training the system to recognize normal operational states, as well as abnormal states, and to establish corresponding reference signals to compare analytically with signals (such as startup responses) from an industrial device being monitored.

In recent years the Sequential Probability Ratio Test ("SPRT") has found beneficial applications as a signal validation tool, particularly the nuclear reactor industry. Two features of the SPRT which make it attractive for parameter surveillance and incipient fault detection are (1) very early annunciation of the onset of a disturbance in noisy process variables, and (2) the fact that the SPRT has user-specifiable false-alarm and missed-alarm probabilities. One limitation of SPRT systems for surveillance of industrial sensors and machinery is that they can provide reliable surveillance only after the equipment being monitored has reached its steady state operating range. During initial startup of machinery and electronic equipment, or during other temporary operating states, there is a transient period when physical variables are not equilibrated to their steady state values.

The time period for transient phenomenon varies widely depending on the type of equipment under surveillance. For example, for nuclear reactor physical variables, it can take several hours to one or two days before the physical processes have fully equilibrated from a startup state. For individual machines (e.g., automotive engines, rotating machinery, tubing pumps), the equilibration period can take several seconds to several minutes. For electronic components, the equilibration period can last only five to ten milliseconds or even less time.

Conventional SPRT systems have been designed to ignore such equilibration periods of an industrial device. For systems with transient phenomena that last on the order of minutes to days, there would conventionally be a requirement that a human operator make a judgment as to when equilibration had been achieved; and then SPRT surveillance can be manually initiated. For systems with very brief transient phenomena, which are too short in duration for a human to observe, the transient phenomena would simply be masked from the SPRT system. In this case the SPRT would be programmed to initiate surveillance a fixed time after actuation of the equipment under surveillance.

There are drawbacks to these conventional approaches of ignoring transient behavior of physical variables. For example, many electronic and mechanical devices undergo their greatest stress during startup or other transient events. Thus, the SPRT surveillance system is inactive during a time in which it may be most likely for a failure to occur. In addition, the transient startup portion of the signal may contain a wealth of diagnostic information relating to wearout condition, alignment, decalibration during shutdown, or the onset of subtle anomalies that actually show a higher signal-to-noise ratio during startup than during steady state operation.

In a more general sense surveillance of industrial devices suffers from misdiagnosis of device response and inability to accurately classify complex industrial device responses. Consequently, there is a general need to analyze such a universe of industrial device signals and identify accurate indicators of abnormal operation or deviations from ideality.

It is therefore an object of the invention to provide a novel neural network classifier system and method of operation to perform analytic translations and scalings of industrial device responses for optimal signal viewing.

It is likewise an object of the invention to provide an improved method and apparatus for monitoring the startup phase or other transient phases of an industrial device.

It is another object of the invention to provide a novel method and apparatus using a neural network system for surveillance, diagnosis, and incipient disturbance annunciation for the startup or other transient responses of an industrial device.

It is yet a further object of the invention to provide an improved method and apparatus for surveillance of the startup or other transient phases of an industrial device to establish attainment of equilibration by the device based on training methods.

It is also an object of the invention to provide a novel method and apparatus for monitoring the startup or other transient phases of an industrial device to ascertain the activation point of a sequential probability ratio test methodology for steady state surveillance.

It is yet another object of the invention to provide an improved method and apparatus to identify anomalous behavior of startup or other transient phase responses of an industrial device.

It is an additional object of the invention to provide a novel method and apparatus to manipulate a transient signal into wavelet feature space to perform analysis using a static neural net system.

Other objects, features, alternative forms and advantages of the present invention will be readily apparent from the following detailed description of the preferred embodiments taken in conjunction with the accompanying drawings described below.

BRIEF DESCRIPTION OF THE DRAWINGS

FIG. 2 illustrates a neural network schematic diagram;

FIG. 12A illustrates a noise histogram for the pump power output of FIG. 8 and FIG. 12B illustrates a noise histogram for the residual function of FIG. 10;

DETAILED DESCRIPTION OF PREFERRED EMBODIMENTS

Figure 1A:
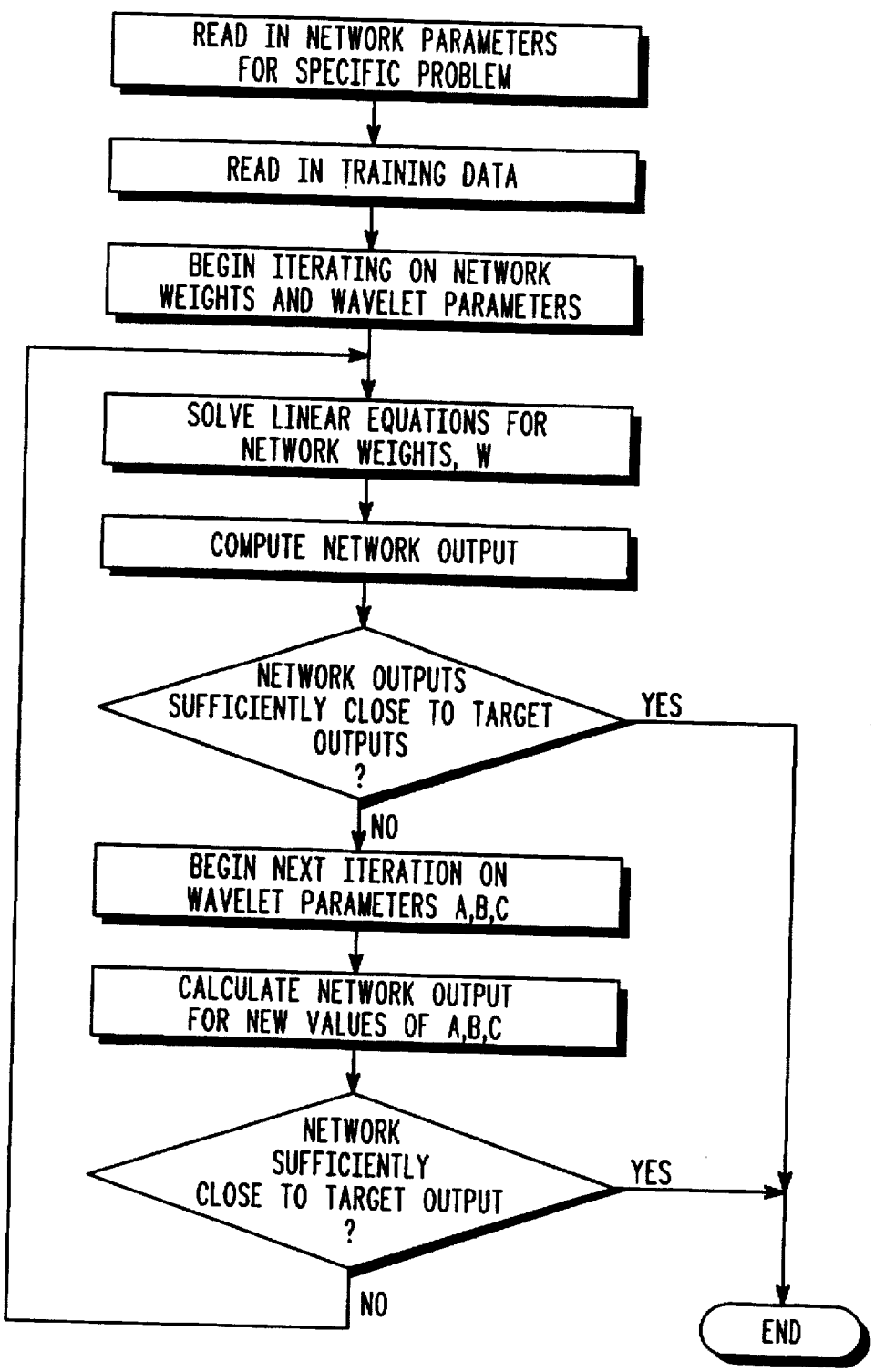
FIGS. 1A, 1B and 1C illustrate flow charts describing operation of a preferred embodiment of a neural net system surveillance of an industrial device response.
Figure 1B:
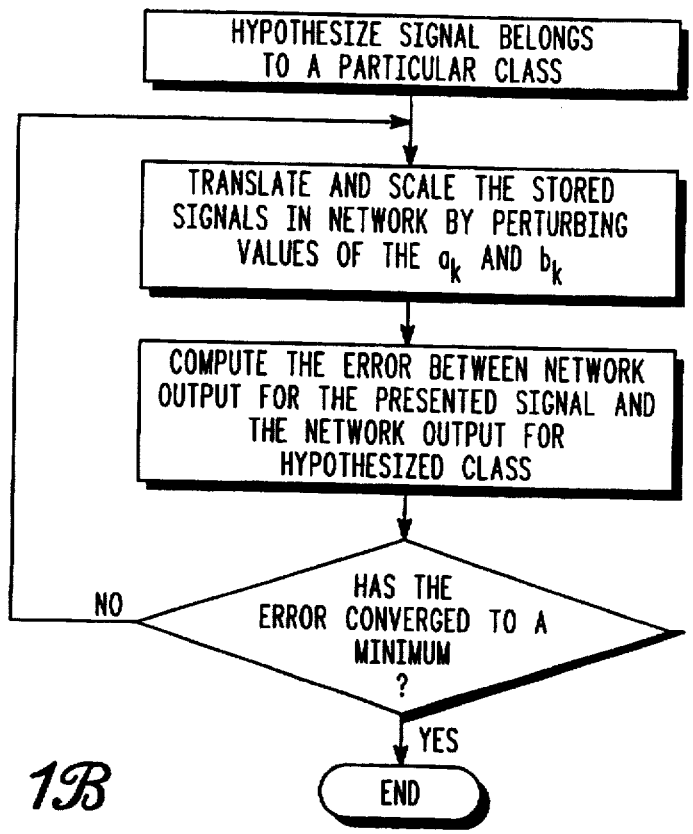
Figure 1C:
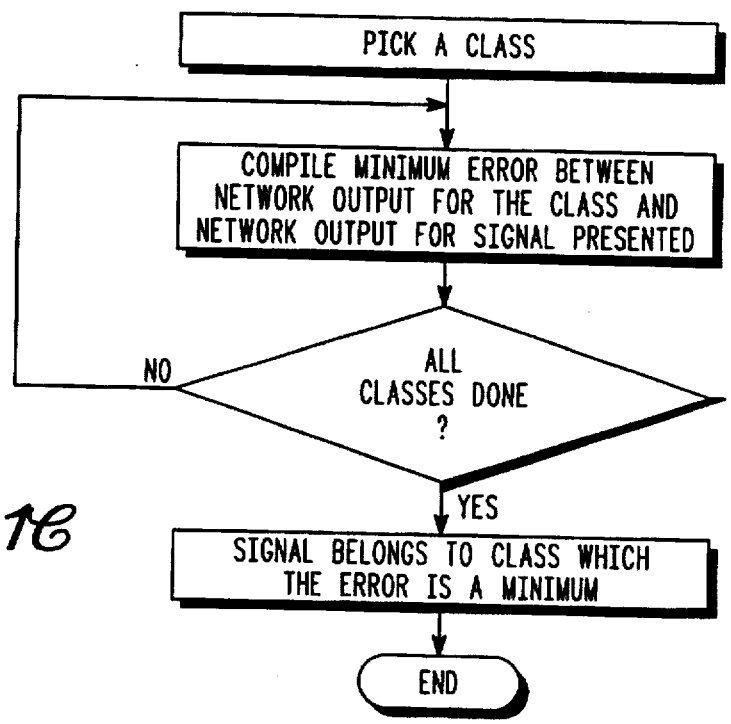

A method of performing surveillance of an industrial device using a neural network 10 (see FIG. 2 diagram) is shown schematically in the functional flow diagrams of FIGS. 1A, 1B and 1C. This set of functionalities are implemented preferably using various computer software routines set forth in the attached Appendices A–I. Industrial devices which are part of manufacturing processes give rise to a potentially rich collection of signals, such as startup responses or other transient responses, that can provide valuable information for diagnosing operating conditions and for scheduling maintenance operations.

The surveillance methods of the invention can be used in a variety of industrial environments, including established or new industrial processes. For example, the extent to which new methods are successfully introduced on the factory floor is determined by several factors. An important factor is how performance fares when the method is introduced on the production line after simulation trials. One needs to be sure that significant non-ideal behavior on the production line has been modeled and taken into account. In this respect, there is a class of data transformations that can occur on the factory floor which need to be considered when designing a neural network classifier constructed in accordance with the invention.

It is known that signal data, to be processed by a pattern recognition technique, can be inadvertently transformed before being sampled by a data acquisition system. In order to analyze the effect, consider a stand-alone piece of industrial equipment which is repeatedly run through a characteristic cycle of operation. This equipment can be located on a production line with operation automatically monitored to provide early detection and diagnosis of improper operation. The speed of the equipment can change under external load or is operator settable causing a scaling in time of the signal. The leading edge of the signal can be translated in time relative to the data acquisition cycle, depending on what triggers the equipment operation. In addition, the presence of noise with a signal can make it difficult to determine the leading edge. Consequently, there is the potential for misalignment of the system: the neural network monitoring the equipment was trained expecting a specific node to correspond to the leading edge of the signal and the time varying part to a specific number of nodes. One can attempt to correct for these effects by numerically translating and scaling the measured signal so as to optimize the fit with stored reference signals. Since the signal is not smoothly varying, however, the presence of noise can make these two operations prone to numerical error. Another approach would be to intentionally translate and scale the training signals so that they span the expected range of the measured data. Consequently, when a measured signal is presented to the neural network, identification is degraded and, second, there is error introduced by curve fitting noisy signals. The invention overcomes these difficulties herein by performing signal pattern recognition by a neural net in a way that is invariant to the affine transformation.

The present invention thus, in part, involves operation of a neural network to translate and scale analytically the network's internal model of each signal class. This methodology has general applicability to surveillance of industrial devices and processes, such as monitoring newly installed methods or new equipment, analyzing startup or transient responses and considering data signals relative to a training set of data using the neural network.

In the case of translating and scaling the model of signal class grouping, the network attempts to align itself such that it best overlays the industrial signal presented at the input. This can be viewed as a tuning exercise that makes up for the inherent difficulty in designing an on-line algorithm that can accurately identify the start and length of a noisy signal when it is presented to the neural network. The representation is chosen so that scaling and translating the reference signal can be done without having to carry out a numerical interpolation. The reference signal is stored in a neural network in analytic form using wavelet functions. The affine representation of time in the wavelet functions allows the reference signal to be translated and scaled without numerical approximation. With the neural net assembled and trained as a classifier, the n reference signals corresponding to the n classes are then each best fit to the presented signal by adjusting the parameters that control the affine representation. The output node with the greatest activation identifies the pattern class to which the presented signal belongs.

One might note, however, that the need to align the presented signal and the network input nodes at some point in the training-operation cycle has not been disposed of. Instead of aligning at the time the signal is presented for classification, as is standard, it is preferably done prior to training to ensure that the network has a crisp stored image. Consequently, one still translates and scales the reference signal. Presumably this can be done with greater intelligence and precision manually prior to training, as opposed to the alternative case, where installation and training are more difficult.

Figure 3A:
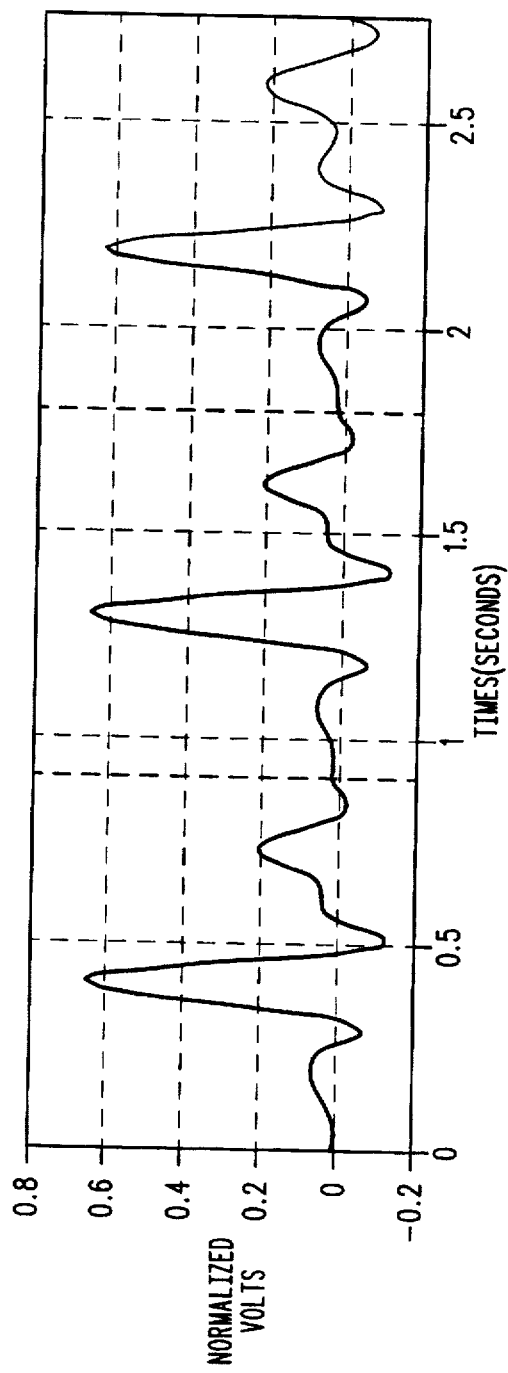
FIGS. 3A and 3B illustrate two example cardiac system signals used to train the neural network of FIG. 2 (FIG. 3A is a normal sinus rhythm and FIG. 3B is an abnormal rhythm—ventricular bigeminy)
Figure 3B:
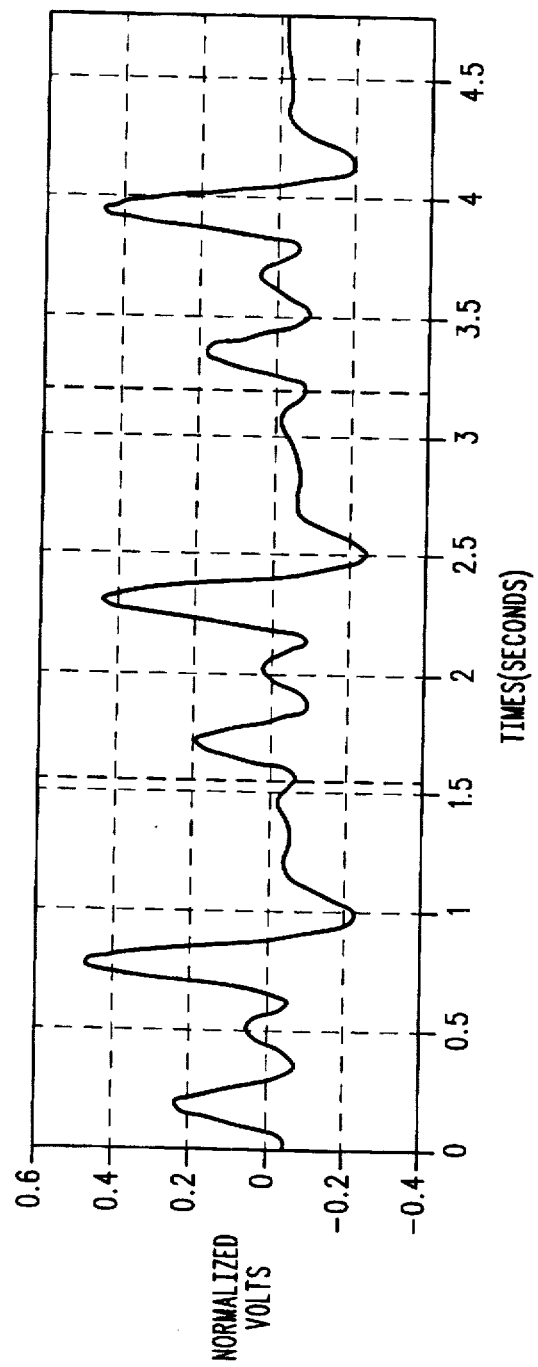

The basic neural network in the method of the invention uses wavelet functions to represent a time dependent signal, such as the signals in FIGS. 3A and 3B associated with the heart signal identification problem for which the network 10 has been used. By adding weights and output nodes, a network architecture with classification capabilities can then be obtained.

Figure 4A:
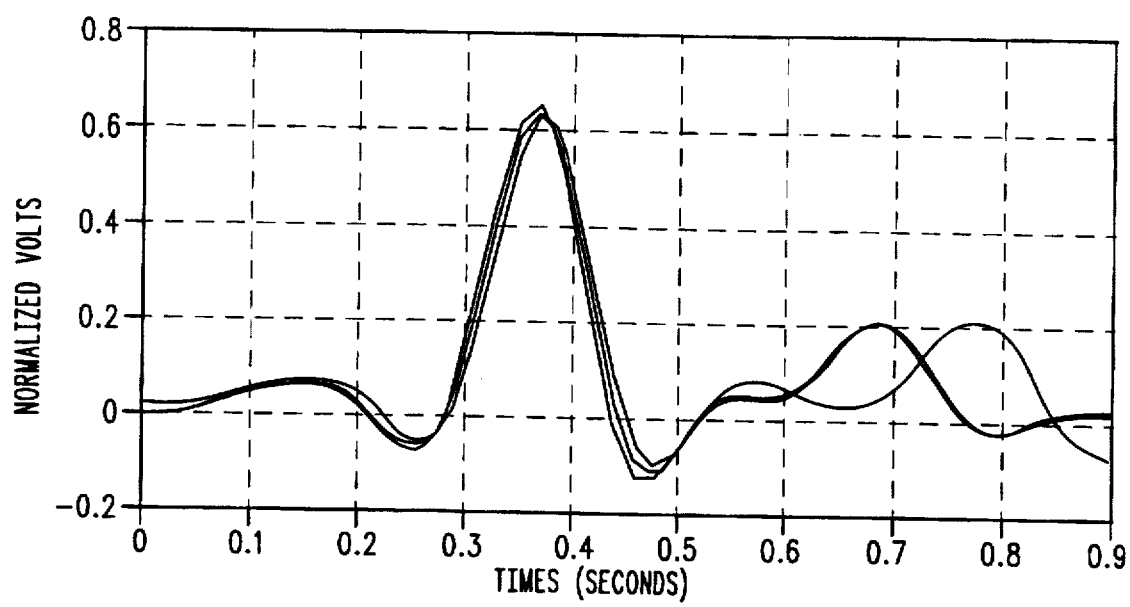
FIGS. 4A and 4B illustrate superimposed cardiac signals presented for recognition (FIG. 4A for the normal sinus rhythm of FIG. 3A and FIG. 4B for the abnormal rhythm of FIG. 3B)
Figure 4B:
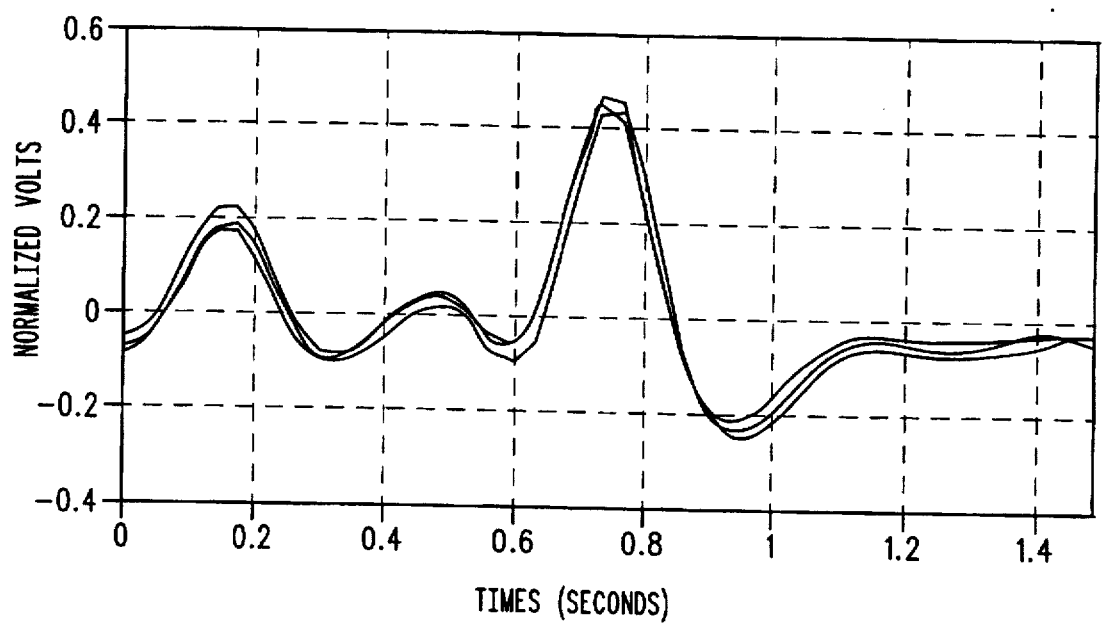
Figure 5A:
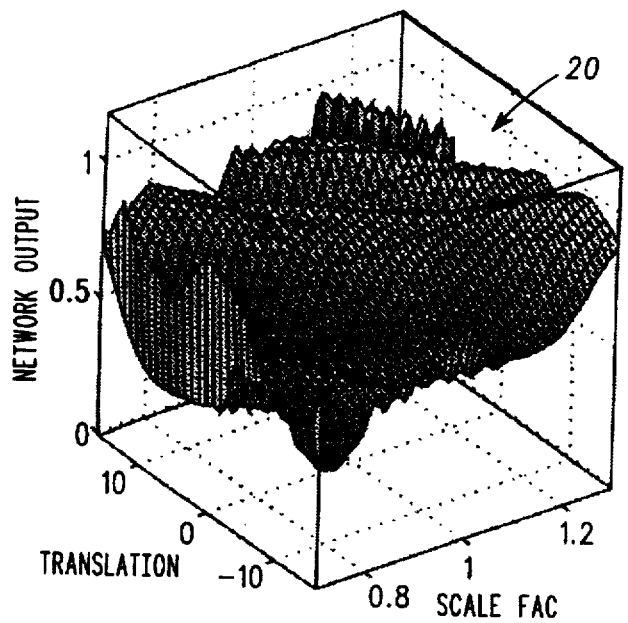
FIGS. 5A–5D illustrate neural network response surfaces in the vicinity of training values with FIGS. 5A, 5B, 5C and 5D being the same surface viewed approximately from each of four cube edge directions.
Figure 5B:
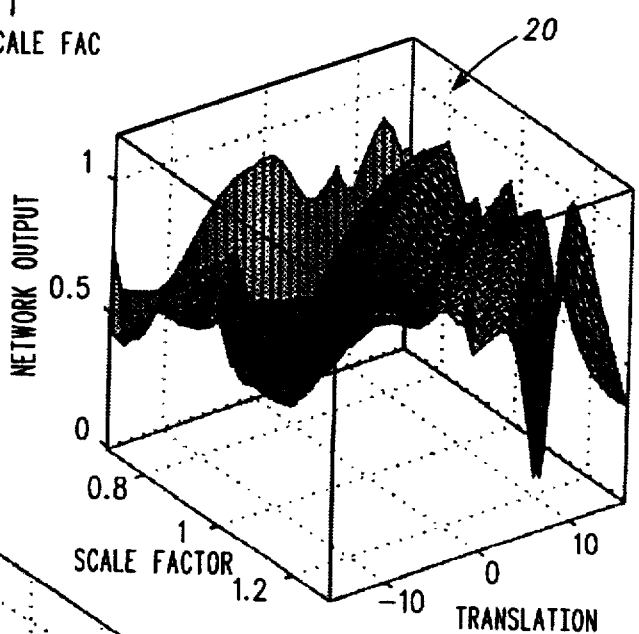
Figure 5C:
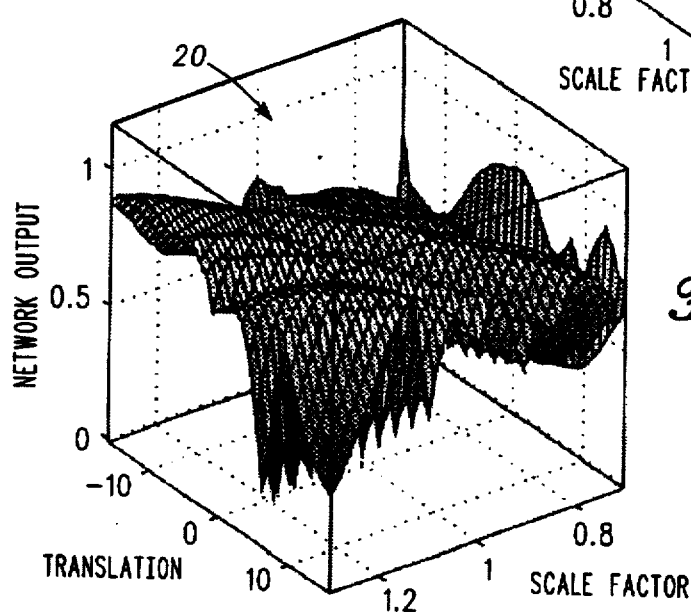
Figure 5D:
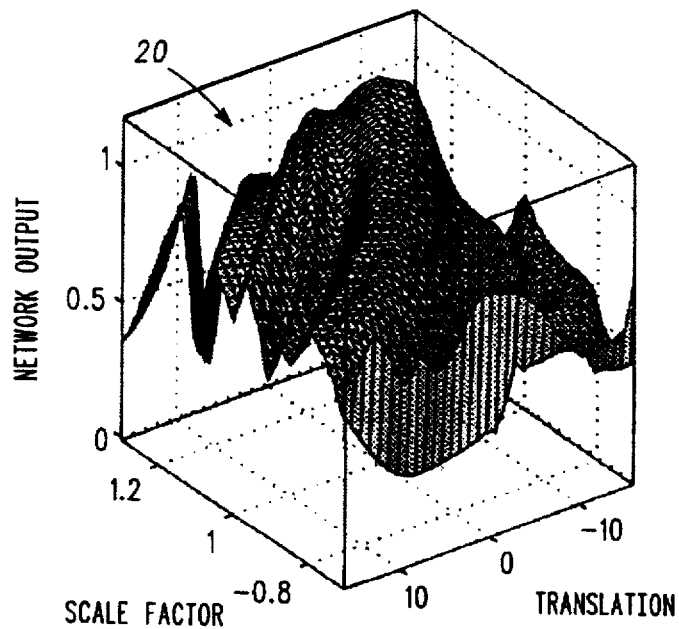

The network can be used to recognize those features in a signal which make it a member of a class of signals that are separate from other classes of signals also to be recognized. FIGS. 4A and 4B shows two different classes of heart signals, a normal rhythm and one exhibiting ventribular bigeminy. The approach is to find a set of basis functions which span the space defined by the input signals. Each signal is regarded as a vector in Cartesian space where each of the sequential sample points lies on its own coordinate axis. The idea is that a small number of basis functions, if properly chosen, can represent many different and complex input signal features. The neural network operates by projecting the input signal onto the basis function coordinate axes. The coordinate values are then passed to a classifier which associates coordinate values with signal classes. In the heart illustrative signal identification problem, the classifier output would indicate either normal heart rhythm or a rhythm exhibiting ventricular bigeminy. Many other potential applications to heart signal identification exist.

The value $U_{p1}$ before scaling of the $p^{th}$ output of the wavelet neural network when the $1^{st}$ signal is presented at the input is given by the following equation:

$$u_{p1} = \sum_{k=1}^{K} w_{kp} \sum_{t=1}^{T} i_1(t) c_k h\left(\frac{t-b_k}{a_k}\right) \quad (1)$$

where, $i_1(t)$ = value of input signal 1 at time t and
$w_{kp} = k_{th}$ weight into output node p.

The sigmoid function is:

$$o_{p1} = \frac{1}{1+e^{-u_{p1}}} \quad (2)$$

and scales the classifier output so that it lies between 0 and 1. A schematic of the neural network 10 is shown in FIG. 2. The bottom three layers 30 of nodes constitute the wavelet features detector part of the network 10 as given by Egs. (1) and (2). The top two layers 40 of nodes constitute the perceptron part of the network 10 and are used to shape the output response surface as described below.

The network 10 shown in FIG. 2 operates as shown in FIGS. 1A–1C so that when a particular signal pattern is presented at the input (e.g., network parameters are read in for a problem in step on of FIG. 1A), a predetermined pattern appears at the output. The specific mapping is learned during a "training" session of the neural network 10. Paired input-output patterns are presented, and the network weights are adjusted so that the neural network 10 reproduces these patterns. The adjustment is made by minimizing the error equation:

$$E = \sum_{p=1}^{P} \frac{1}{2} \sum_{l=1}^{L} (t_{p1} - o_{p1})^2 \quad (3)$$

where $t_{p1}$ = target value at $p^{th}$ output node when input signal 1 is presented to the network 10. Since this equation is non-linear, it is most preferably minimized through an iterative procedure.

Because each input node represents a point in time, there is a correspondence between the point at which a time varying signal begins to vary and the node with which this leading edge is coincident. This alignment is established during a training session. After the neural network has been trained, the same alignment needs to be followed when a pattern is presented for recognition.

An automatic viewing feature has been developed to produce a classifier system that is tolerant to differences in alignment between the network input nodes and the presented signal. Such a feature is useful when identifying heart signals. For example, differences in pulse rates among patients are one source of misalignment. The method used in implementing the system is composed of two parts: the training part where network weights are computed (see FIG. 1A in the third and fourth steps), and the signal viewing part where the already trained network 10 is adjusted for an optimal fit to the signal presented for classification (see FIG. 1B).

As shown in FIG. 1A, the neural network 10 has been successfully trained if the error equation given by Eq. (3) is minimized when the training data is inserted (second step of FIG. 1A). One approach would be to use a gradient descent method to find the corresponding values of $w_{kp}$, $a_k$, $b_k$ and $c_k$. In the present invention, however, linearity characteristics permit solving directly for $w_{kp}$ for given values of $a_k$, $b_k$ and $c_k$ (see step three of FIG. 1A). This reduces the dimension of the search space thereby accelerating the training process. Inserting the target values in Eq. (1) (note step six in FIG. 1A) and combining with Eq. (2) gives an equation which is linear in $w_{kp}$:

$$\ln\left(\frac{1}{t_{p1}} - 1\right) = -\sum_{k=1}^{K} w_{kp} \sum_{t=1}^{T} i_1(t) c_k h\left(\frac{t-b_k}{a_k}\right) \quad (4)$$

which in matrix notation is $$AW = B \quad (5)$$

where $$[A]_{lk} = -\sum_{t=1}^{T} i_1(t) c_k h\left(\frac{t-b_k}{a_k}\right)$$

$l = 1, \ldots L \quad k = 1, \ldots K$ $[W]_{kp} = w_{kp}$ $[B]_{l,p} = \ln\left(\frac{1}{t_{p1}} - 1\right)$ The solution to the above equation, if one exists, is one that minimizes the right side of Eq. (3).

If no solution exists when searching on the $w_{kp}$ alone, which will almost always be the case if there are more signals than wavelets, the $a_k$, $b_k$ and $c_k$ are introduced to provide additional degrees of freedom. First, a best set of $w_{kp}$ is found by least squares. Then a gradient descent method is used while holding the $w_{kp}$ constant to find values for the wavelet parameters $a_k$, $b_k$ and $c_k$ that minimize Eq. (3) (see steps four to six in FIG. 1A). These values are inserted back into Eq. (5), and the process is repeated (see steps seven to nine in FIG. 1A) until Eq. (3) has been minimized with respect to all the $w_{kp}$, $a_k$, $b_k$ and $c_k$.

The partial derivatives used in a gradient decent method are given by $$\frac{\partial E}{\partial a} = \sum_{p=1}^{P} \sum_{l=1}^{L} (t_{p1} - o_{p1}) o_{p1}^2 e^{-u_{p1}} \frac{\partial u_{p1}}{\partial a}, \quad (6)$$

$$a = w_{rs}a_r b_r c_r.$$

where the derivatives on the right hand side are given by $$\frac{\partial u_{p1}}{\partial w_{rs}} = \sum_{t=1}^{T} i_1(t) h\left(\frac{t-b_r}{a_r}\right), \quad s = p \quad (7)$$

$$= 0, \quad s \neq p$$

$$\frac{\partial u_{p1}}{\partial a_r} = \frac{-w_{rp}}{a_r^2} \sum_{t=1}^{T} (t - b_r) \frac{\partial h(\beta)}{\partial \beta} i_1(t) \quad (8)$$

$$\frac{\partial u_{p1}}{\partial b_r} = -\frac{w_{rp}}{a_r} \sum_{t=1}^{T} \frac{\partial h(\beta)}{\partial \beta} i_1(t) \quad (9)$$

$$\frac{\partial u_{p1}}{\partial c_r} = \sum_{k=1}^{K} w_{kp} \sum_{t=1}^{T} i_1(t) h\left(\frac{t-b_k}{a_k}\right) \quad (10)$$

The first of the above four equations is not used if one solves for the w values directly by least squares according to the above method.

In order to recognize a signal as an affine transformed version of another signal, the neural network preferably is only trained on the latter signal. For example, the network is to recognize a normal but rapid heartbeat as belonging to the class defined by a normal heartbeat defined at some standard, e.g., 70 beats/sec. for a heart rate. Then when the former signal is presented to the neural network for classification, the neural network will converge to values for s and r such that:

$$u_{p1} = \sum_{k=1}^{K} w_{kp} \sum_{t=1}^{T} i_1(t) c_k h\left(\frac{t-b_k}{a_k}\right) \quad (11)$$

where $$t' = \frac{(t-s)}{r} \quad (12)$$

equals the learned output for the latter signal. The means for converging to the values of s and r present a problem, however. Any search strategy will necessarily involve computing the network output at other values of s and r. Since the corresponding signals are not in the training set, the network output will be indeterminate.

The solution is to not only train on that one signal which represents the class (see step one of FIG. 1B), but also train on translated and scaled versions (see step two of FIG. 1B) in the neighborhood of that signal as set forth in FIG. 1B. The target output values are set lower so that a gradient is established (see step three of FIG. 1B). A Cartesian coordinate system is set up with the original signal at the point (0,1). The first axis corresponds to the translate dimension and the second axis to the scale dimension. Enough grid points are included in the training set so that a well shaped response surface is created. If the presented signal is a member of the class of signals corresponding to this response surface, then a search along the two dimensions will lead to the peak (see last step of FIG. 1B).

Now consider the case where the presented signal is a member of a second class for which the output has been encoded differently (see step one of FIG. 1C). Hypothesize that the signal presented belongs to the first class. Then when r and s values are searched over, to drive the network output toward the target for the first class, the final difference (between the actual network output and the class target) will be larger than if the neural network had been driven toward the second class target. A numerical arbiter would detect this difference and assign the signal to the second class. We therefore have two assumptions built into the neural network. As shown in step one of FIG. 1C, the first assumption is that the presented signal must belong to one of the classes. The second assumption is that the presented signal belongs to the class for which the error between class target and actual output is least.

The response surface typically has many local extrema that make the search for a global extremum using a gradient search method unreliable. Many local extrema exist because the width of a wavelet basis function is typically much smaller than the length of the signal. Many basis functions are then needed to represent the signal. To avoid this difficulty a genetic search technique is used. This method maintains an image of the overall surface topography and is less likely to become stuck at a local extrema.

The shaping of the response surface so that it conforms to the training data is facilitated by the perceptron component of the network 10. This component appears as the top two layers 40 of nodes in FIG. 2. The network weights in the perceptron component provide additional degrees of freedom for achieving a convex surface characterized by a single extrema.

Results obtained with human heart signals are used to illustrate application of the invention. Heart signals exhibit the same characteristics as are found in manufacturing data which are important from the standpoint of this network 10. These include repetitive sequence of one-shot signal waveforms (e.g., a single heartbeat) that can be affine transformed. A normal, lead two, heartbeat is shown in FIG. 3A. A heartbeat exhibiting ventricular bigeminy is shown in FIG. 3B. The vertical dashed lines delineate a single pattern. The degree of reproducibility within a class is shown in FIG. 4A and 4B with superimposed signals.

The pattern recognition problem is to determine whether the signal presented for recognition, which may be affine transformed an unknown amount, is the normal sinus rhythm ("class I") or the abnormal rhythm ("class II"). The signals presented for identification have been translated up to sixteen sample intervals (about 6%) to either side of the leading edge of the same class signal stored in the network and have been compressed or dilated up to twenty percent with the left edge of the signal anchored. The degree of variability of signals within a class is small as seen in FIGS. 4A and 4B, and is much smaller than the degree of translation and scaling being admitted. Since the class patterns are significantly different, the optimal viewing feature should in principle return a crisp indication of class and affine parameter values.

The network output is a single node with the target values binary encoded. The target output is 0.9 for class I and 0.1 for class II signal data. Because the neural network contains exponentials at the output, it is standard to represent the logical 0 and 1 states at the output by 0.1 and 0.9 respectively. The values 0 and 1 can be achieved only by having an essentially infinite value at the argument of the exponential, which gives rise to numerical difficulties.

The wavelet basis functions, h(t), are given by $$h(t) = ce^{-\left(\frac{t-b}{a}\right)} \quad (13)$$

As a first approximation, the initial values for the parameters a, b and c were chosen so that each peak of the signals shown in FIGS. 4A and 4B was overlaid with the above distribution. This gave a total of five basis functions. The initial values are shown in the Table I below.

TABLE I

Initial and Final Parameter Values

| Basis Function | Initial $a_o$ | Initial $b_o$ | Initial $c_o$ | Initial a | Initial b | Initial c |
|---|---|---|---|---|---|---|
| $h_1$ | 5 | 50 | 0.700 | 5.212 | 75.613 | −0.340 |
| $h_2$ | 15 | 125 | 0.200 | 15.855 | 125.626 | 0.219 |
| $h_3$ | 5 | 45 | 0.550 | 2.108 | 49.087 | 0.721 |
| $h_4$ | 13 | 75 | −0.200 | 3.219 | 78.183 | −0.678 |
| $h_5$ | 7 | 200 | 0.250 | 24.588 | 182.831 | 0.089 |

The neural network was trained in a two-step process. In the first step, the network weights and the values of the parameters in Table I that produce the target outputs were calculated. The target output for the heart signals in FIG. 4A was 0.9 and for the signals in FIG. 4B, it was 0.1. The resulting values are shown in Table I. The purpose of the second step was to build a response surface 20 (see FIGS. 5A–5D) in the neighborhood of each of the two training points in step 1. The response surface 20 gives the value of the network output as a function of the amount the signal presented in step one is translated and scaled when presented in step two. The global extremum is at (0,1) and has the same value as in step 1. In other words, if the unity scaling and zero translation signal from class I (normal sinus rhythm) were presented to the neural network, the output would be 0.9. Scaled (different pulse rate) and translated versions of this same signal give network outputs less extreme in value. The key in building the response surface is to ensure that the global extremum occurs at unity scaling and zero translation. The presence of local extremum is not important if a genetic algorithm is used in the search for the global extremum. The response surface was built during the second training session by including the new training signals shown in Table II. These are scaled and translated versions of the heart signals in FIGS. 4A and 4B.

a signal is stretched while anchored at the left edge, shifting to the left will tend to restore the stretched signal back to the original.

To identify the pattern class to which a signal belongs, the presented signal is tested for membership in each of the classes stored in the neural network. If their are n classes, then the presented signal must be tested n times. Each time, the signal is hypothesized to belong to a different class than those already tested. An error function which is the squared difference of the target output for the hypothesized class and the actual network output for the signal is minimized. The minimization is done by searching over r and s where the network output is given by Eqs. (2) and (11). When all n classes have been tested, the class corresponding to the least error is the class where the signal belongs (see step four of FIG. 1C).

One can observe qualitatively in FIGS. 5A–5D how successful the neural network will be in determining the affine parameter values for a class I signal presented for viewing. If the affine parameter values of the presented signal lie off the main ridge, the neural network will return values that lie on the main ridge. As for there being a strong optimum along the ridge, this will not be the case because the peak of the ridge is more nearly a line rather than a point. This simply means that there are various combinations of translation and scaling of the presented signal that make it match the signal in FIG. 4A.

Figure 6A:
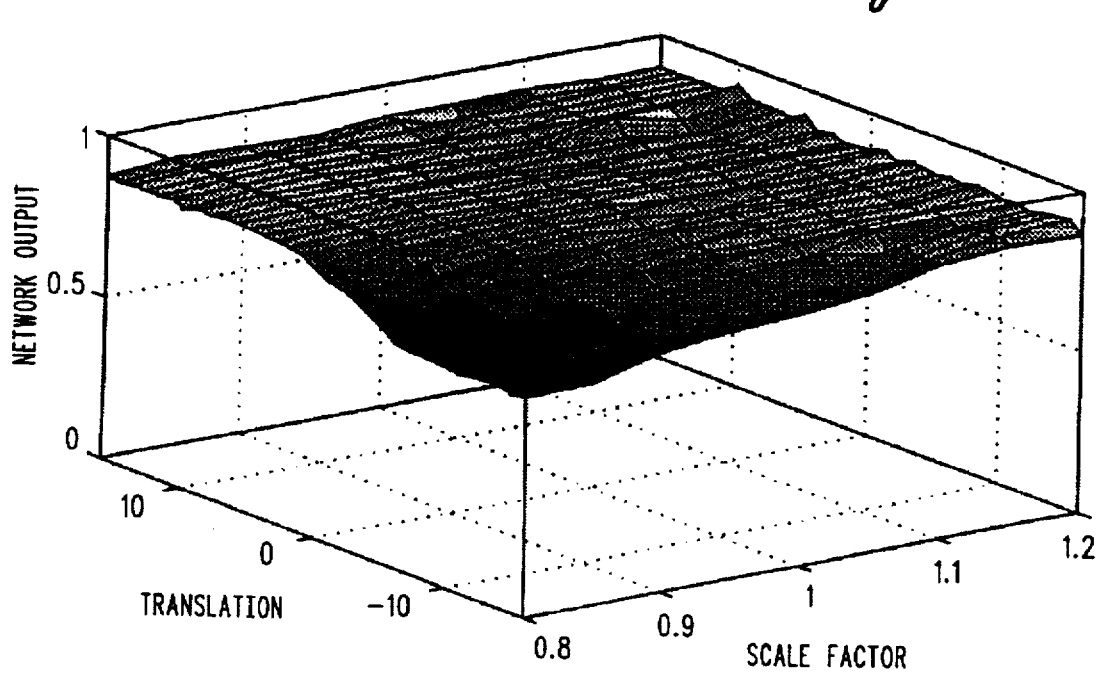
FIG. 6A illustrates a network classification surface for a normal cardiac signal class with a normal class hypothesis and FIG. 6B illustrates a network classification surface for a normal cardiac signal class but with an abnormal class hypothesis.
Figure 6B:
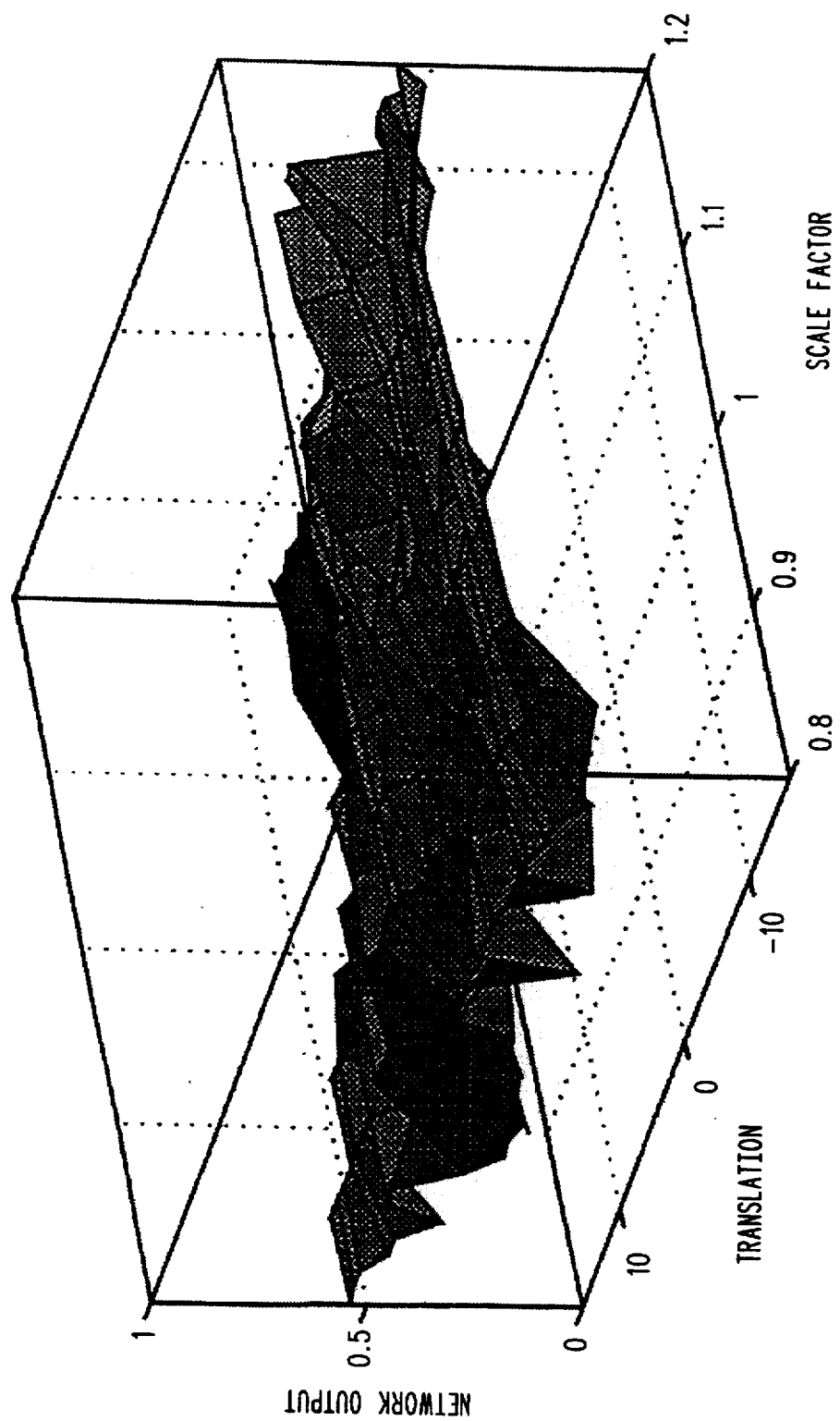

The network quite reliably determines to which class the affine transformed input signal belongs. This is seen in FIGS. 6A and 6B. The vertical axis shows the network output after a genetic search was performed for each point in the horizontal plane. Each point on this plane represents an affine transformed copy of a class I training signal. The hypothesis in the upper plot was that the signal was class I; and as seen in FIG. 6A, the network output is almost uniformly 0.9. The lower plot was obtained by hypothesizing the signal was from class II. The network output remains far from 0.1. The top plot is closer to 0.9 than the bottom plot

TABLE II

Target and Actual Network Outputs After Training

| Class I Input | Translation | Scaling Factor | Target Output | Actual Output | Class II Input | Translation | Scaling Factor | Target Output | Actual Output |
|---|---|---|---|---|---|---|---|---|---|
| $i_1$ | 0 | 1.00 | 0.900 | 0.896 | $i_{10}$ | 0 | 1.00 | 0.100 | 0.150 |
| $i_2$ | −16 | 1.00 | 0.750 | 0.758 | $i_{11}$ | −16 | 1.00 | 0.250 | 0.255 |
| $i_3$ | 16 | 1.00 | 0.750 | 0.752 | $i_{12}$ | 16 | 1.00 | 0.250 | 0.281 |
| $i_4$ | 0 | 0.90 | 0.750 | 0.744 | $i_{13}$ | 0 | 0.90 | 0.250 | 0.219 |
| $i_5$ | 0 | 1.10 | 0.750 | 0.782 | $i_{14}$ | 0 | 1.10 | 0.250 | 0.253 |
| $i_6$ | 16 | 0.90 | 0.600 | 0.587 | $i_{15}$ | 16 | 0.90 | 0.400 | 0.378 |
| $i_7$ | 16 | 1.10 | 0.600 | 0.608 | $i_{16}$ | 16 | 1.10 | 0.400 | 0.407 |
| $i_8$ | −16 | 0.90 | 0.600 | 0.585 | $i_{17}$ | −16 | 0.90 | 0.400 | 0.388 |
| $i_9$ | −16 | 0.90 | 0.600 | 0.623 | $i_{18}$ | −16 | 0.90 | 0.400 | 0.404 |

Ten additional wavelet basis functions were included to provide more degrees of freedom.

Figure 7A:
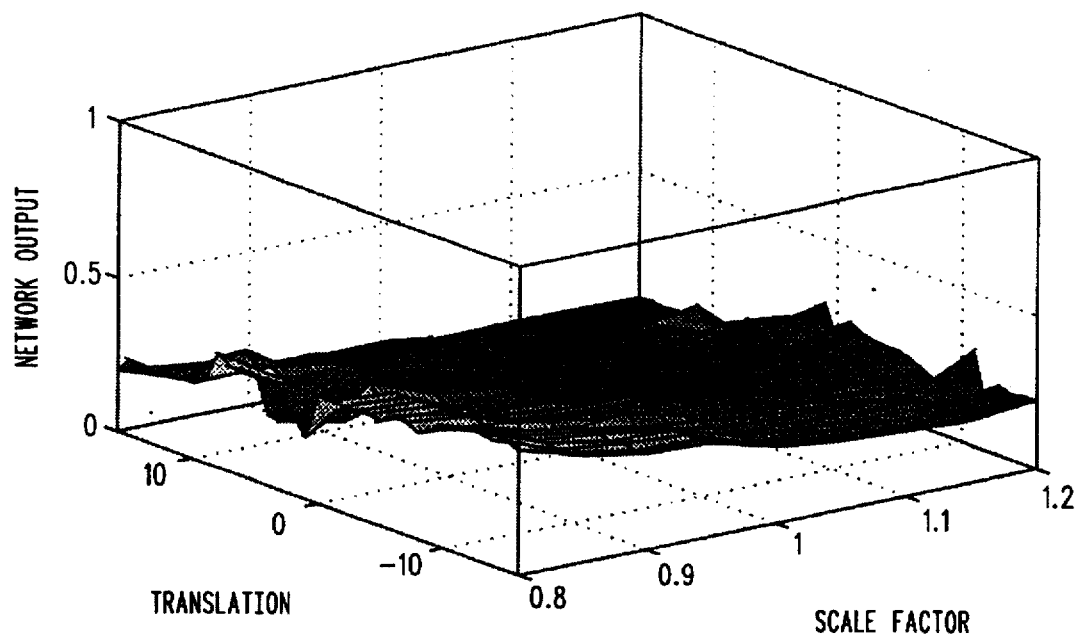
FIG. 7A illustrates a network classification surface for an abnormal cardiac signal class with a hypothesized abnormal class and FIG. 7B illustrates a network classification surface for an abnormal cardiac signal class with a hypothesized normal class.
Figure 7B:
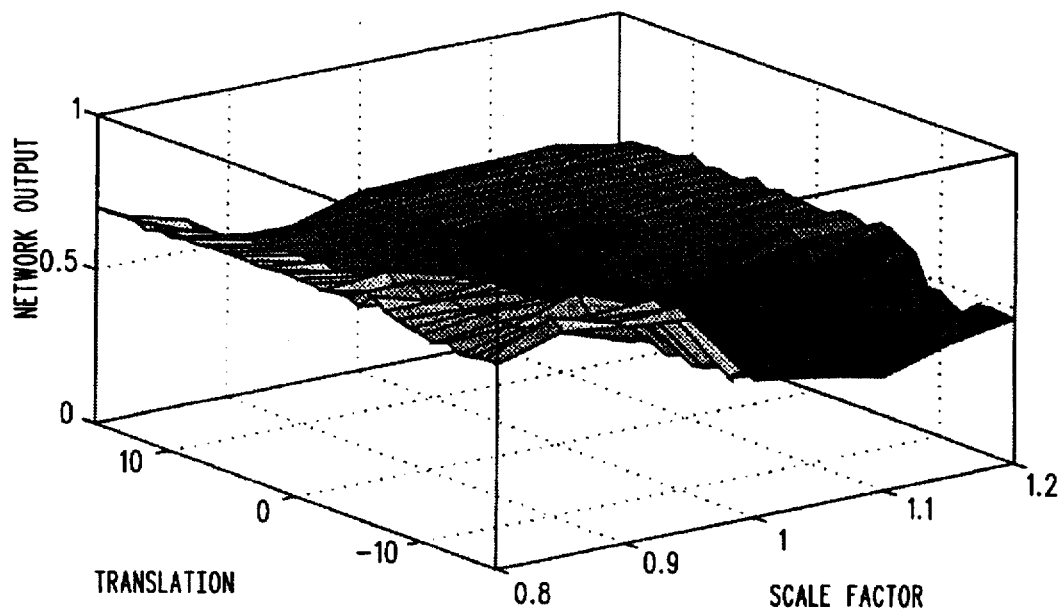

The response surface 20 created for signal class I (normal sinus rhythm) is shown in FIGS. 5A–5D. The surface extremum is a ridge that contains the point (0,1). This should be interpreted as follows. Since the signals along the ridge have very nearly the same output value as the point (0,1), each of these signals when affine transformed backwards according to their coordinates will yield very nearly the signal at (0,1). Thus there are many ordered pairs of translation and scaling of the signal at (0,1) that produce signals that are close. This is to be expected, since, for example, if is to 0.1 at all points in the horizontal plane, indicating that every transformed version of the signal is correctly classified. The degree of rejection of a hypothesis is proportional to the difference between the actual network output, after the genetic search has converged, and the target value. The difference should be greatest when the hypothesis is false. The parallel of FIG. 6B for a presented class II signal is shown in FIGS. 7A and 7B. The results presented in FIGS. 6A, 6B, 7A and 7B show that the neural network is one hundred percent effective in classifying the affine transformed heart signals.

Figure 15A:
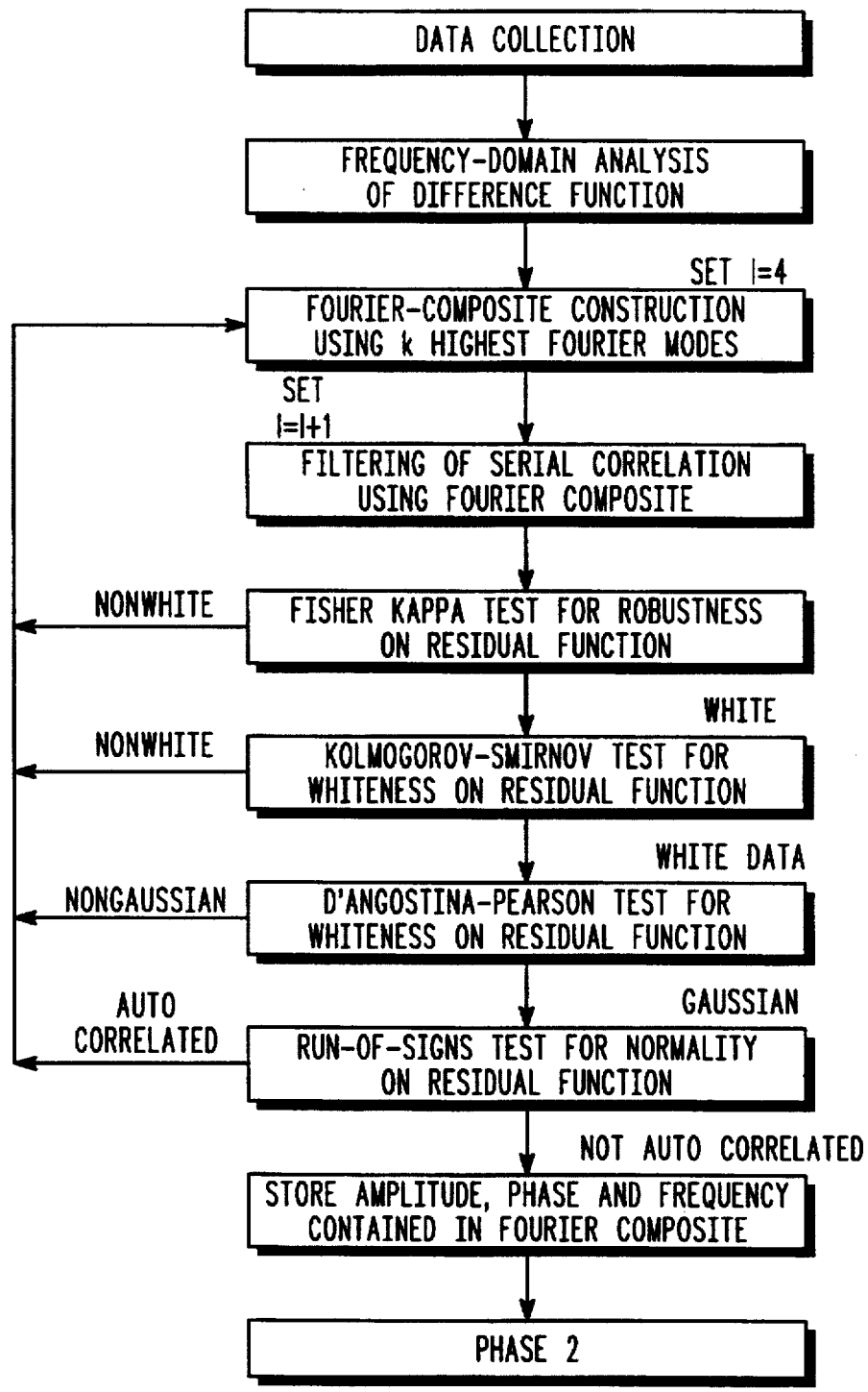
FIG. 15A and 15B illustrate a schematic functional flow diagram of the invention with FIG. 15A showing a first phase of the method of the invention and FIG. 15B shows the application of the method of the invention.
Figure 15B:
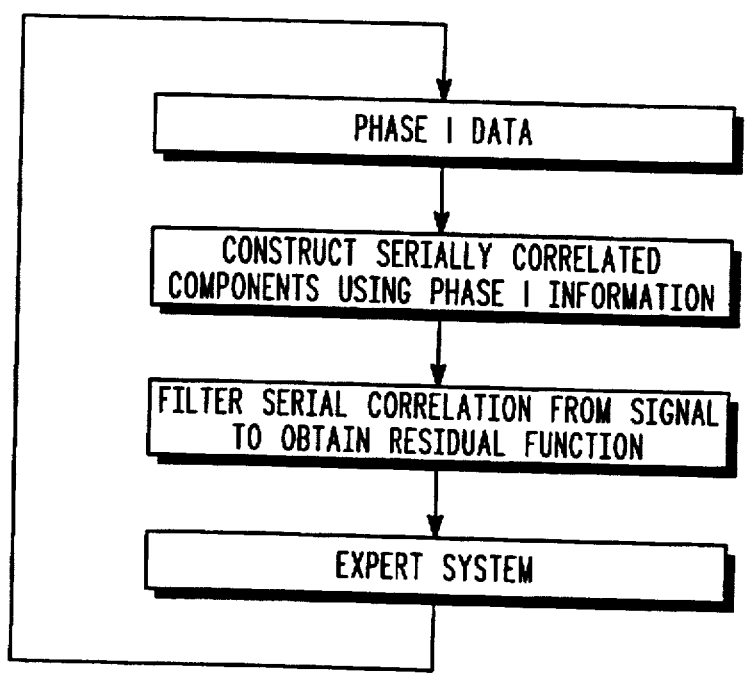

Once the neural network 10 has been used to analyze transient signals, the presence of equilibrated signals can be determined, and then control will be passed to the SPRT technique which is to be used on equilibrium state signals. The character of "transient" signals can be stated as a pattern appearing in the middle field of three fields contiguous in time. The detected signal remains constant in the two outer fields with the occasional appearance of small changes due to processor sensor noise. The leading edge of the time varying part of the signal is in general detected by computing a moving average and ascertaining when the derivative of this average consistently breaks through a preset near zero threshold value or it can be detected by a hypothesis test. Similarly, the trailing edge can be detected by ascertaining when the derivative consistently remains below the preset near zero threshold or it can be detected by a hypothesis test. Once the equilibrated signal state is identified, signals from industrial sensors can be used to annunciate or terminate degrading or anomalous processes of such equilibrated states. The sensor signals are manipulated to provide input data to a statistical analysis technique, such as the SPRT methodology. Details of this process and the invention therein are disclosed in U.S. Pat. No. 5,223,207 which is incorporated by reference herein in its entirety. A further illustration of the use of SPRT for analysis of data bases is set forth in U.S. Pat. No. 5,410,492 and copending application of the assignee U.S. Pat. No. 5,459,675, also incorporated by reference herein in their entirety. In performing a preferred analysis of the sensor signals as shown in FIGS. 15A and 15B, a dual transformation method is performed, insofar as it entails both a frequency-domain transformation of the original time-series data and a subsequent time-domain transformation of the resultant data. The data stream that passes through the dual frequency-domain, time-domain transformation is then processed with the SPRT procedure, which uses a log-likelihood ratio test. A computer software Appendix I is also attached hereto covering the SPRT procedure and its implementation in the context of, and modified by, the instant invention.

In one preferred embodiment, successive data observations are performed on a discrete process Y, which represents a comparison of the stochastic components of physical processes monitored by a sensor, and most preferably pairs of sensors. In practice, the Y function is obtained by simply differencing the digitized signals from two respective sensors. Let $y_k$ represent a sample from the process Y at time $t_k$. During normal operation with an undegraded physical system and with sensors that are functioning within specifications the $y_k$ should be normally distributed with mean of zero. Note that if the two signals being compared do not have the same nominal mean values (due, for example, to differences in calibration), then the input signals will be pre-normalized to the same nominal mean values during initial operation.

In performing the monitoring of industrial processes, the system's purpose is to declare a first system, a second system, etc., degraded if the drift in Y is sufficiently large that the sequence of observations appears to be distributed about a mean $+M$ or $-M$, where $M$ is our pre-assigned system-disturbance magnitude. We would like to devise a quantitative framework that enables us to decide between two hypotheses, namely:

$H_1$: Y is drawn from a Gaussian probability distribution function ("PDF") with mean M and variance $\sigma^2$.

$H_2$: Y is drawn from a Gaussian PDF with mean 0 and variance $\sigma^2$.

We will suppose that if $H_1$ or $H_2$ is true, we wish to decide for $H_1$ or $H_2$ with probability $(1-\beta)$ or $(1-\alpha)$, respectively, where $\alpha$ and $\beta$ represent the error (misidentification) probabilities.

From the conventional, well known theory of Wald, the test depends on the likelihood ratio $l_n$, where $$l_n = \frac{\text{The probability of observed sequence } y_1, y_2 \ldots, y_n \text{ given } H_1 \text{ true}}{\text{The probability of observed sequence } y_1, y_2 \ldots, y_n \text{ given } H_2 \text{ true}} \quad (14)$$

After "n" observations have been made, the sequential probability ratio is just the product of the probability ratios for each step:

$$l_n = (PR_1) \cdot (PR_2) \cdot \ldots \cdot (PR_n) \quad (15)$$

or $$l_n = \prod_{k=1}^{k=n} \frac{f(y_1|H_1)}{f(y_1|H_1)} \quad (16)$$

where f(y|H) is the distribution of the random variable y.

Wald's theory operates as follows: Continue sampling as long as $A < l_n < B$. Stop sampling and decide $H_1$ as soon as $l_n > B$, and stop sampling and decide $H_2$ as soon as $l_n \leq A$. The acceptance thresholds are related to the error (misidentification) probabilities by the following expressions:

$$A = \frac{\beta}{1-\alpha}, \text{ and } B = \frac{1-\beta}{\alpha} \quad (17)$$

The (user specified) value of $\alpha$ is the probability of accepting $H_1$ when $H_2$ is true (false-alarm probability). $\beta$ is the probability of accepting $H_2$ when $H_1$ is true (missed-alarm probability).

If we can assume that the random variable $y_k$ is normally distributed, then the likelihood that $H_1$ is true (i.e., mean M, variance $\sigma^2$) is given by:

$$L(y_1, y_2, \ldots, y_n | H_1) = \quad (18)$$

$$\frac{1}{(2\pi)^{n/2} \sigma^n} \exp\left[ -\frac{1}{2\sigma^2} \left( \sum_{k=1}^{n} y_k^2 - 2 \sum_{k=1}^{n} y_k M + \sum_{k=1}^{n} M^2 \right) \right]$$

Similarly for $H_2$ (mean 0, variance $\sigma^2$):

$$L(y_1, y_2, \ldots, y_n | H_2) = \frac{1}{(2\pi)^{n/2} \sigma^n} \exp\left( -\frac{1}{2\sigma^2} \sum_{k=1}^{n} y_k^2 \right) \quad (19)$$

The ratio of (18) and (19) gives the likelihood ratio $l_n$ $$l_n = \exp\left[ -\frac{1}{2\sigma^2} \sum_{k=1}^{n} M(M - 2y_k) \right] \quad (20)$$

Combining (17) and (20), and taking natural logs gives $$\ln \frac{\beta}{1-\alpha} < \frac{-1}{2\sigma^2} \sum_{k=1}^{n} M(M - 2y_k) < \ln \frac{(1-\beta)}{\alpha} \quad (21)$$

Our sequential sampling and decision strategy can be concisely represented as:

If $l_n \leq \ln \frac{\beta}{1-\alpha}$,     Accept $H_2$     (22)

If $\ln \frac{\beta}{1-\alpha} < l_n < \ln \frac{1-\beta}{\alpha}$,     Continue Sampling     (23)

And if $l_n \geq \ln \frac{1-\beta}{\alpha}$,     Accept $H_1$     (24)

Following Wald's sequential analysis, it is conventional that a decision test based on the log likelihood ratio has an optimal property; that is, for given probabilities $\alpha$ and $\beta$ there is no other procedure with at least as low error probabilities or expected risk and with shorter length average sampling time.

A primary limitation that has heretofore precluded the applicability of Wald-type binary hypothesis tests for sensor and equipment surveillance strategies lies in the primary assumption upon which Wald's theory is predicated; i.e., that the original process Y is strictly "white" noise, independently-distributed random data. White noise is thus well known to be a signal which is uncorrelated. Such white noise can, for example, include Gaussian noise. It is, however, very rare to find physical process variables associated with operating machinery that are not contaminated with serially-correlated, deterministic noise components. Serially correlated noise components are conventionally known to be signal data whose successive time point values are dependent on one another. Noise components include, for example, auto-correlated (also known as serially correlated) noise and Markov dependent noise. Auto-correlated noise is a known form of noise wherein pairs of correlation coefficients describe the time series correlation of various data signal values along the time series of data. That is, the data $U_1, U_2, \ldots, U_n$ have correlation coefficients $(U_1, U_2), (U_2, U_3), \ldots, (U_{n-1}, U_n)$ and likewise have correlation coefficients $(U_1, U_3) (U_2, U_4)$, etc. If these data are auto-correlated, at least some of the coefficients are nonzero. Markov dependent noise, on the other hand, is a very special form of correlation between past and future data signals. Rather, given the value of $U_k$, the values of $U_n$, n>k, do not depend on the values of $U_j$ where j<k. This implies the correlation pairs $(U_j, U_n)$, given the value $U_k$, are all zero. If, however, the present value is imprecise, then the correlation coefficients may be nonzero. One form of this invention can overcome this limitation to conventional surveillance strategies by integrating the Wald sequential test approach with a new dual transformation technique. This symbiotic combination of frequency-domain transformations and time-domain transformations produces a tractable solution to a particularly difficult problem that has plagued signal-processing specialists for many years.

In one preferred embodiment of the method shown in detail in FIGS. 15A and 15B, serially-correlated data signals from an industrial process can be rendered amenable to the SPRT testing methodology described hereinbefore. This is preferably done by performing a frequency-domain transformation of the original difference function Y. A particularly preferred method of such a frequency transformation is accomplished by generating a Fourier series using a set of highest "1" number of modes. Other procedures for rendering the data amenable to SPRT methods includes, for example, auto regressive techniques, which can accomplish substantially similar results described herein for Fourier analysis. In the preferred approach of Fourier analysis to determine the "1" highest modes (see FIG. 15A):

$$Y_1 = \frac{a_0}{2} + \sum_{m=1}^{\frac{N}{2}} (a_m \cos\omega_m t + b_m \sin\omega_m t) \quad (25)$$

where $\alpha_0/2$ is the mean value of the series, $a_m$ and $b_m$ are the Fourier coefficients corresponding to the Fourier frequency $\omega_m$, and N is the total number of observations. Using the Fourier coefficients, we next generate a composite function, $X_r$, using the values of the largest harmonics identified in the Fourier transformation of $Y_r$. The following numerical approximation to the Fourier transform is useful in determining the Fourier coefficients $a_m$ and $b_m$. Let $x_j$ be the value of $X_r$ at the jth time increment. Then assuming $2\pi$ periodicity and letting $\omega_m = 2\pi m/N$, the approximation to the Fourier transform yields:

$$a_m = \frac{2}{N} \sum_{j=0}^{N-1} x_j \cos\omega_m j \quad b_m = \frac{2}{N} \sum_{j=0}^{N-1} x_j \sin\omega_m j \quad (26)$$

for 0<m<N/2. Furthermore, the power spectral density ("PSD") function for the signal is given by $1_m$ where $$l_m = N \frac{a_m^2 + b_m^2}{2} \quad (27)$$

To keep the signal bandwidth as narrow as possible without distorting the PSD, no spectral windows or smoothing are used in our implementation of the frequency-domain transformation. In analysis of a pumping system of the EBR-II reactor of Argonne National Laboratory, the Fourier modes corresponding to the eight highest $1_m$ provide the amplitudes and frequencies contained in $X_r$. In our investigations for the particular pumping system data taken, the highest eight $1_m$ modes were found to give an accurate reconstruction of $X_r$ while reducing most of the serial correlation for the physical variables studied. In other industrial processes, the analysis could result in more or fewer modes being needed to accurately construct the functional behavior of a composite curve. Therefore, the number of modes used is a variable which is iterated to minimize the degree of nonwhite noise for any given application. As noted in FIG. 15A a variety of noise tests are applied in order to remove serially correlated noise.

The reconstruction of $X_r$ uses the general form of Eqn. (25), where the coefficients and frequencies employed are those associated with the eight highest PSD values. This yields a Fourier composite curve (see end of flowchart in FIG. 15A) with essentially the same correlation structure and the same mean as $Y_r$. Finally, (see FIG. 15B) we generate a discrete residual function $R_t$ by differencing corresponding values of $Y_t$ and $X_r$. This residual function, which is substantially devoid of serially correlated contamination, is then processed with the SPRT technique described hereinbefore.

In a specific example application of the above referenced methodology, certain variables were monitored from the Argonne National Laboratory reactor EBR-II. In particular, EBR-II reactor coolant pumps (RCPs) and delayed neutron (DN) monitoring systems were tested continuously to demonstrate the power and utility of the invention. All data used in this investigation were recorded during full-power, steady state operation at EBR-II. The data have been digitized at a 2-per-second sampling rate using $2^{14}$ (16,384) observations for each signal of interest.

Figure 8:
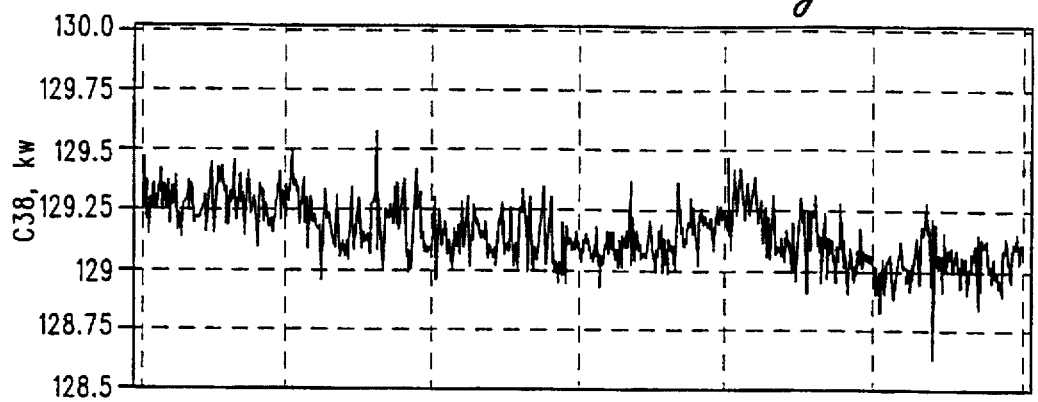
FIG. 8 illustrates the specified output of a pump's power output over time.
Figure 9:
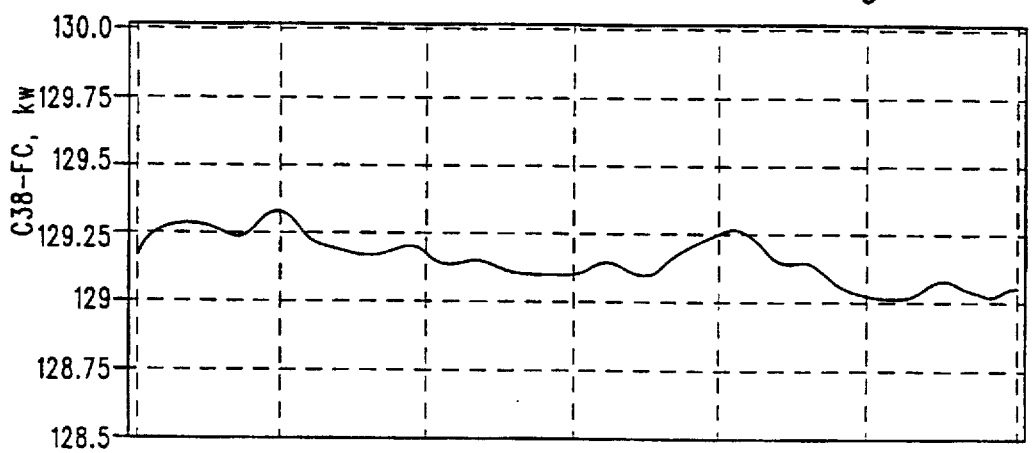
FIG. 9 shows a Fourier composite curve generated using the pump spectral output of FIG. 8.
Figure 10:
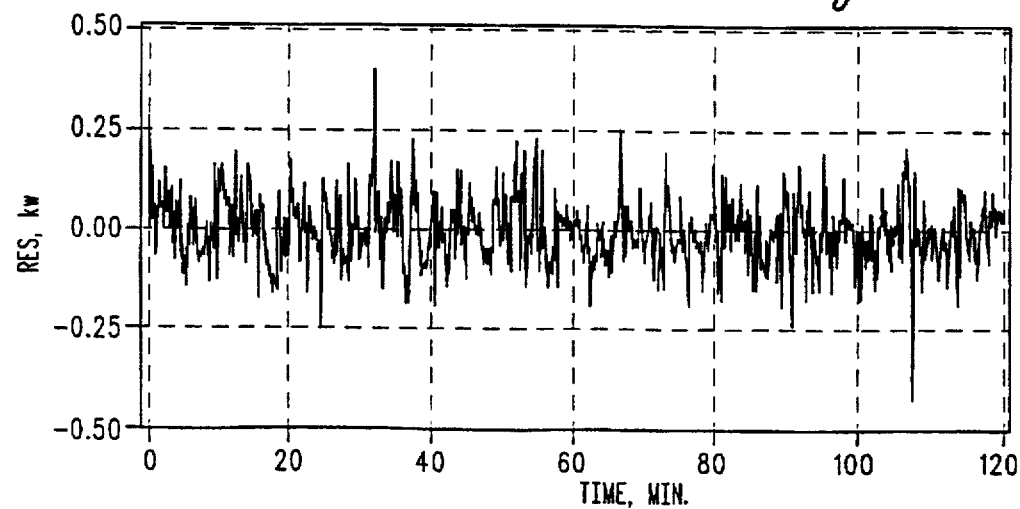
FIG. 10 illustrates a residual function characteristic of the difference between FIGS. 8 and 9.
Figure 11A:
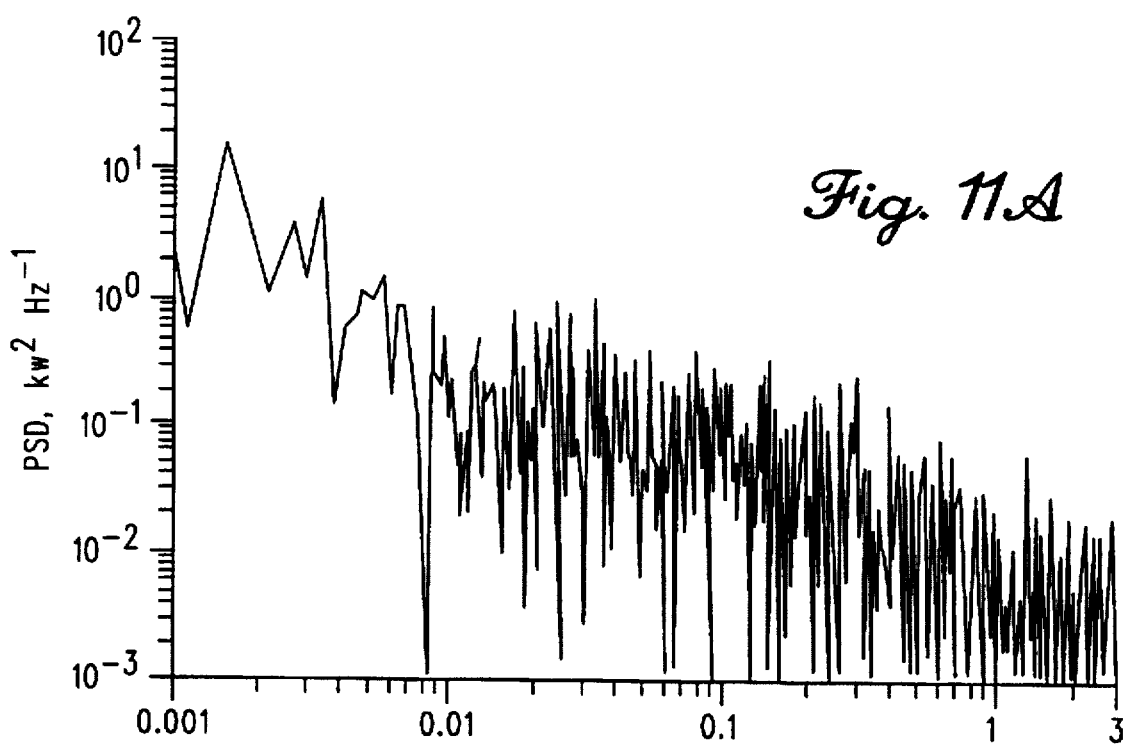
FIG. 11A shows a periodogram of the spectral data of FIG. 8
Figure 11B:
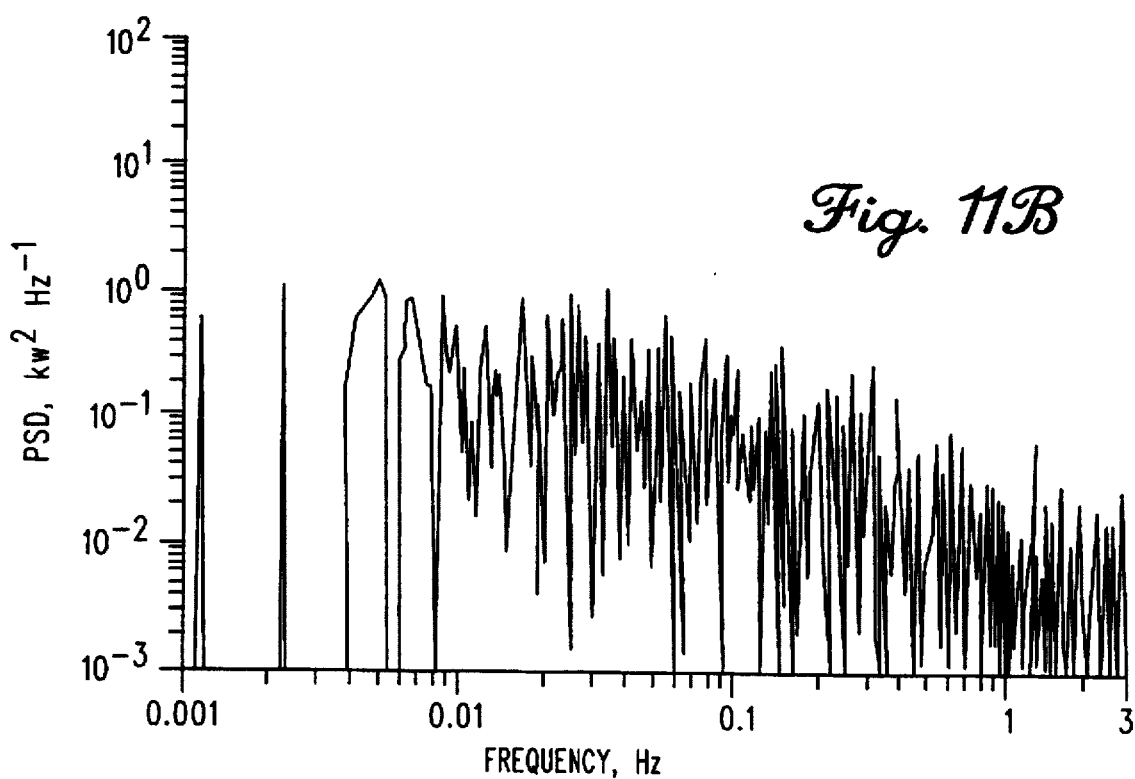
FIG. 11B shows a periodogram of the residual function of FIG. 10.

FIG. 8 illustrates data associated with the preferred spectral filtering approach as applied to the EBR-II primary pump power signal, which measures the power (in kW) needed to operate the pump. The basic procedure of FIGS. 15A and 15B was then followed in the analysis. FIG. 1 shows 136 minutes of the original signal as it was digitized at the 2-Hz sampling rate. FIG. 9 shows a Fourier composite constructed from the eight most prominent harmonics identified in the original signal. The residual function, obtained by subtracting the Fourier composite curve from the raw data, is shown in FIG. 10. Periodograms of the raw signal and the residual function have been computed and are plotted in FIGS. 11A and 11B. Note the presence of eight depressions in the periodogram of the residual function in FIG. 11B, corresponding to the most prominent periodicities in the original, unfiltered data. Histograms computed from the raw signal and the residual function are plotted in FIGS. 12A and 12B. For each histogram shown we have superimposed a Gaussian curve (solid line) computed from a purely Gaussian distribution having the same mean and variance.

Comparison of FIG. 12A and 12B provides a clear demonstration of the effectiveness of the spectral filtering in reducing asymmetry in the histogram. Quantitatively, this decreased asymmetry is reflected in a decrease in the skewness (or third moment of the noise) from 0.15 (raw signal) to 0.10 (residual function).

It should be noted here that selective spectral filtering, which we have designed to reduce the consequences of serial correlation in our sequential testing scheme, does not require that the degree of nonnormality in the data will also be reduced. For many of the signals we have investigated at EBR-II, the reduction in serial correlation is, however, accompanied by a reduction in the absolute value of the skewness for the residual function.

To quantitatively evaluate the improvement in whiteness effected by the spectral filtering method, we employ the conventional Fisher Kappa white noise test. For each time series we compute the Fisher Kappa statistic from the defining equation $$\kappa = \left[\frac{1}{N} \sum_{k=1}^{N} l(\omega_k)\right]^{-1} l(L) \quad (28)$$

where $l(\omega_k)$ is the PSD function (see Eq. 27) at discrete frequencies $\omega_k$, and $l(L)$ signifies the largest PSD ordinate identified in the stationary time series.

The Kappa statistic is the ratio of the largest PSD ordinate for the signal to the average ordinate for a PSD computed from a signal contaminated with pure white noise. For EBR-II the power signal for the pump used in the present example has a K of 1940 and 68.7 for the raw signal and the residual function, respectively. Thus, we can say that the spectral filtering procedure has reduced the degree of non-whiteness in the signal by a factor of 28. Strictly speaking, the residual function is still not a pure white noise process. The 95% critical value for Kappa for a time series with 214 observations is 12.6. This means that only for computed Kappa statistics lower than 12.6 could we accept the null hypothesis that the signal is contaminated by pure white noise. The fact that our residual function is not purely white is reasonable on a physical basis because the complex interplay of mechanisms that influence the stochastic components of a physical process would not be expected to have a purely white correlation structure. The important point, however, is that the reduction in nonwhiteness effected by the spectral filtering procedure using only the highest eight harmonics in the raw signal has been found to preserve the pre-specified false alarm and missed alarm probabilities in the SPRT sequential testing procedure (see below). Table III summarizes the computed Fisher Kappa statistics for 13 EBR-II plant signals that are used in the subject surveillance systems. In every case the table shows a substantial improvement in signal whiteness.

The complete SPRT technique integrates the spectral decomposition and filtering process steps described hereinbefore with the known SPRT binary hypothesis procedure. The process can be illustratively demonstrated by application of the SPRT technique to two redundant delayed neutron detectors (designated DND-A and DND-B) whose signals were archived during long-term normal (i.e., undegraded) operation with a steady DN source in EBR-II. For demonstration purposes a SPRT was designed with a false alarm rate, α, of 0.01. Although this value is higher than we would designate for a production surveillance system, it gives a reasonable frequency of false alarms so that asymptotic values of α can be obtained with only tens of thousands of discrete observations. According to the theory of the SPRT technique, it can be easily proved that for pure white noise (such as Gaussian), independently distributed processes, a provides an upper bound to the probability (per observation interval) of obtaining a false alarm—i.e., obtaining a "data disturbance" annunciation when, in fact, the signals under surveillance are undegraded.

FIGS. 13 illustrate sequences of SPRT results for raw DND signals and for spectrally-whitened DND signals, respectively. In FIGS. 13A and 13B, and 14A and 14B, respectively, are shown the DN signals from detectors DND-A and DND-B. The steady state values of the signals have been normalized to zero.

TABLE III

Effectiveness of Spectral Filtering for Measured Plant Signals

| Plant Variable I.D. | Fisher Kappa Test Statistic (N = 16,384) | |
|---|---|---|
| | Raw Signal | Residual Function |
| Pump 1 Power | 1940 | 68.7 |
| Pump 2 Power | 366 | 52.2 |
| Pump 1 Speed | 181 | 25.6 |
| Pump 2 Speed | 299 | 30.9 |
| Pump 1 Radial Vibr (top) | 123 | 67.7 |
| Pump 2 Radial Vibr (top) | 155 | 65.4 |
| Pump 1 Radial Vibr (bottom) | 1520 | 290.0 |
| Pump 2 Radial Vibr (bottom) | 1694 | 80.1 |
| DN Monitor A | 96 | 39.4 |
| DN Monitor B | 81 | 44.9 |
| DN Detector 1 | 86 | 36.0 |
| DN Detector 2 | 149 | 44.1 |
| DN Detector 3 | 13 | 8.2 |

Figure 13A:
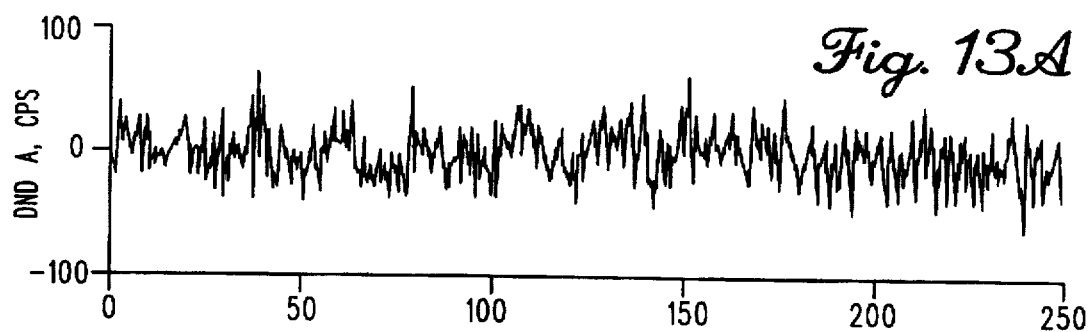
FIG. 13A shows an unmodified delayed neutron detector signal from a first sensor and FIG. 13B is for a second neutron sensor.
Figure 13B:
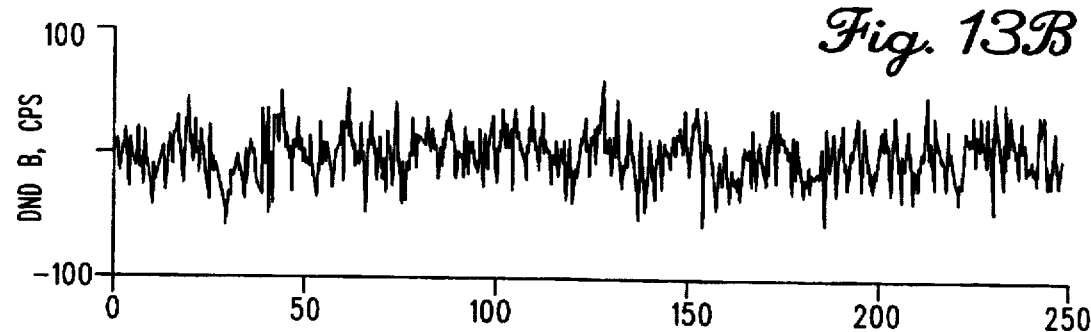
Figure 13C:
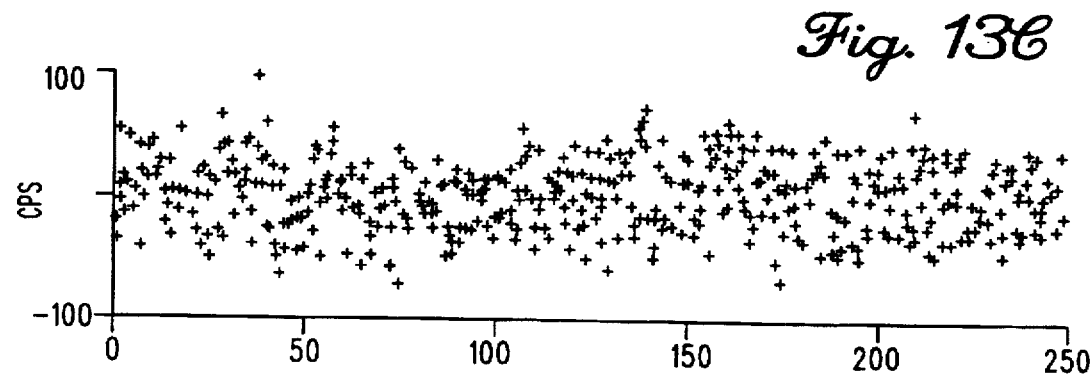
FIG. 13C shows a difference function characteristic of the difference between data in FIGS. 13A and 13B and FIG. 13D shows the data output from a SPRT analysis with alarm conditions indicated by the symbols.

Normalization to adjust for differences in calibration factor or viewing geometry for redundant sensors does not affect the operability of the SPRT. FIGS. 13C and 14C in each figure show pointwise differences of signals DND-A and DND-B. It is this difference function that is input to the SPRT technique. Output from the SPRT method is shown for a 250-second segment in FIGS. 13D and 14D.

Figure 13D:
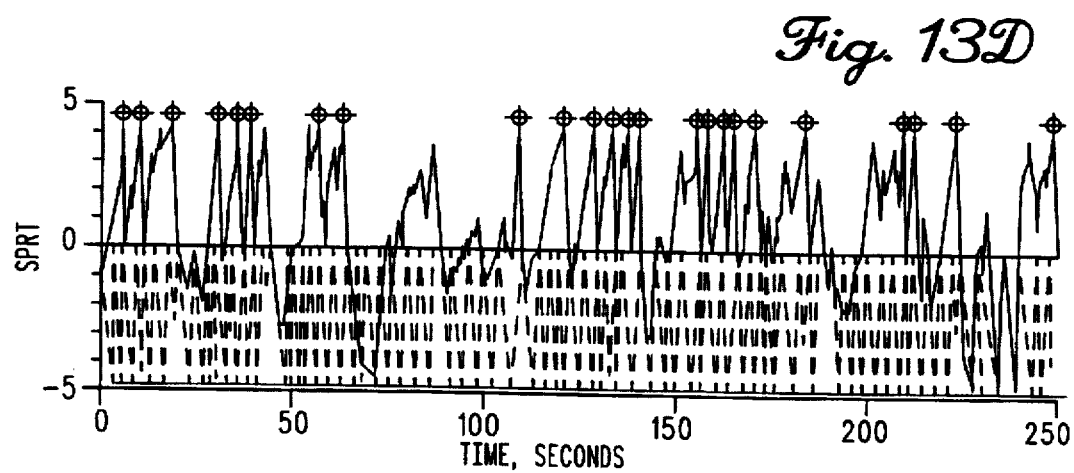
Figure 14A:
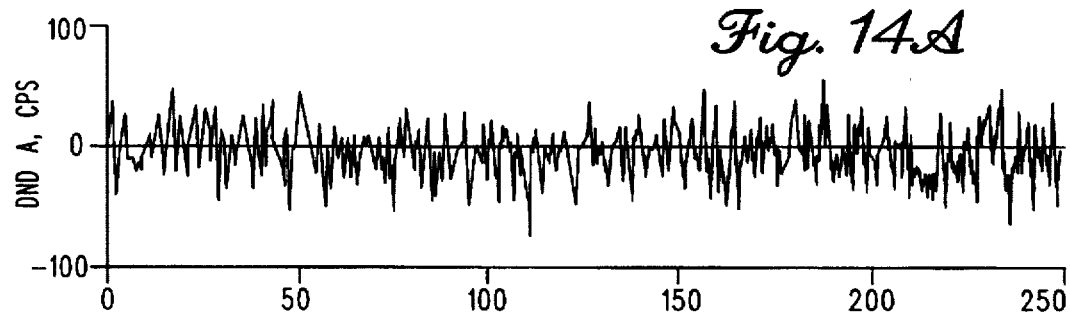
FIG. 14A illustrates an unmodified delayed neutron detector signal from a first sensor and FIG. 14B is for a second neutron sensor.
Figure 14B:
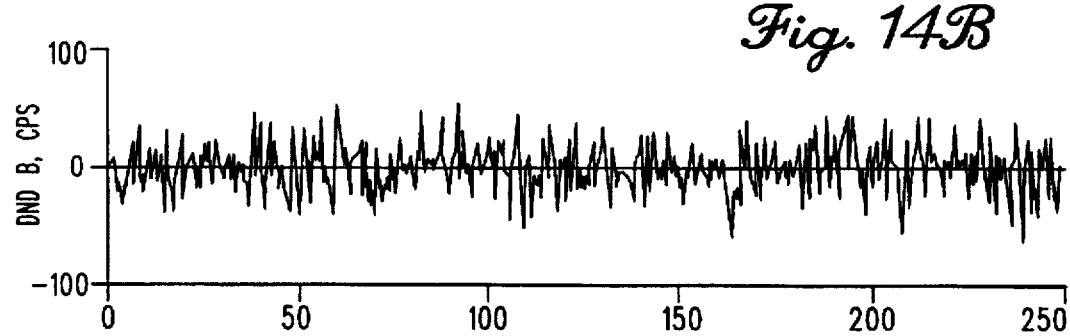
Figure 14C:
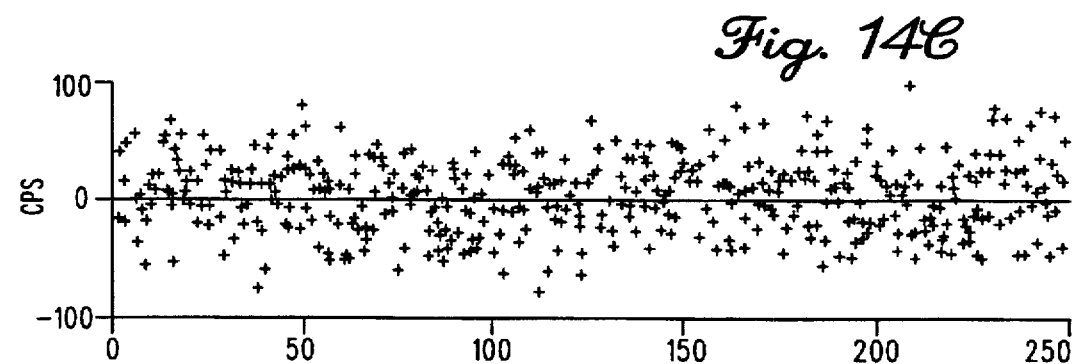
FIG. 14C shows a difference function for the difference between the data of FIGS. 14A and 14B and FIG. 14D shows the result of using the instant invention to modify the difference function to provide data free of serially correlated noise to the SPRT analysis to generate alarm information and with alarm conditions indicated by the symbols.
Figure 14D:
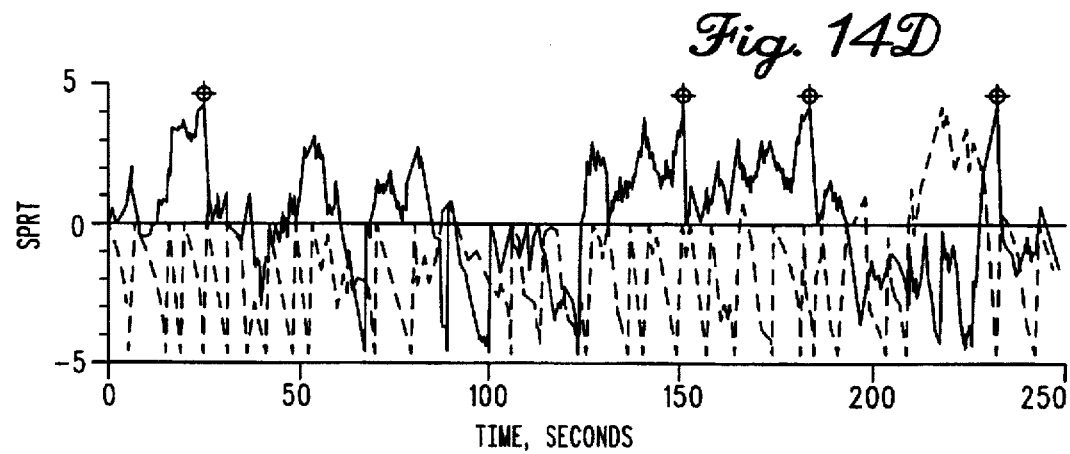

Interpretation of the SPRT output in FIGS. 13D and 14D is as follows: When the SPRT index reaches a lower threshold, A, one can conclude with a 99% confidence factor that there is no degradation in the sensors. For this demonstration A is equal to 4.60, which corresponds to false-alarm and missed-alarm probabilities of 0.01. As FIGS. 13D and 14D illustrate, each time the SPRT output data reaches A, it is reset to zero and the surveillance continues.

If the SPRT index drifts in the positive direction and exceeds a positive threshold, B, of +4.60, then it can be concluded with a 99% confidence factor that there is degradation in at least one of the sensors. Any triggers of the positive threshold are signified with diamond symbols in FIGS. 13D and 14D. In this case, since we can certify that the sensors were functioning properly during the time period our signals were being archived, any triggers of the positive threshold are false alarms.

If we extend sufficiently the surveillance experiment illustrated in FIG. 13D, we can get an asymptotic estimate of the false alarm probability α. We have performed this exercise using 1000-observation windows, tracking the frequency of false alarm trips in each window, then repeating the procedure for a total of 16 independent windows to get an estimate of the variance on this procedure for evaluating the false alarm probability. The resulting false-alarm frequency for the raw, unfiltered, signals is α=0.07330 with a variance of 0.000075. The very small variance shows that there would be only a negligible improvement in our estimate by extending the experiment to longer data streams.

This value of a is significantly higher than the design value of α=0.01, and illustrates the danger of blindly applying a SPRT test technique to signals that may be contaminated by excessive serial correlation.

The data output shown in FIG. 14D employs the complete SPRT technique shown schematically in FIGS. 15A and 15B. When we repeat the foregoing exercise using 16 independent 1000-observation windows, we obtain an asymptotic cumulative false-alarm frequency of 0.009142 with a variance of 0.000036. This is less than (i.e., more conservative than) the design value of α=0.01, as desired.

It will be recalled from the description hereinbefore regarding one preferred embodiment, we have used the eight most prominent harmonics in the spectral filtration stage of the SPRT technique. By repeating the foregoing empirical procedure for evaluating the asymptotic values of a, we have found that eight modes are sufficient for the input variables shown in Table III. Furthermore, by simulating subtle degradation in individual signals, we have found that the presence of serial correlation in raw signals gives rise to excessive missed-alarm probabilities as well. In this case spectral whitening is equally effective in ensuring that pre-specified missed-alarm probabilities are not exceeded using the SPRT technique.

In a different form of the invention, it is not necessary to have real sensors paired off to form a difference function. Each single sensor can provide a real signal characteristic of an ongoing process and a second artificial signal can be generated to allow formation of a difference function. Techniques such as an auto regressive moving average (ARMA) methodology can be used to provide the appropriate signal, such as a DC level signal, a cyclic signal or other predictable signal. Such an ARMA method is a well-known procedure for generating artificial signal values, and this method can even be used to learn the particular cyclic nature of a process being monitored enabling construction of the artificial signal.

The two signals, one a real sensor signal and the other an artificial signal, can thus be used in the same manner as described hereinbefore for two (paired) real sensor signals. The difference function Y is then formed, transformations performed and a residual function is determined which is free of serially correlated noise.

Fourier techniques are very effective in achieving a whitened signal for analysis, but there are other means to achieve substantially the same results using a different analytical methodology. For example, filtration of serial correlation can be accomplished by using the ARMA method. This ARMA technique estimates the specific correlation structure existing between sensor points of an industrial process and utilizes this correlation estimate to effectively filter the data sample being evaluated.

A technique has therefore been devised which integrates frequency-domain filtering with sequential testing methodology to provide a solution to a problem that is endemic to industrial signal surveillance. The subject invention particularly allows sensing slow degradation that evolves over a long time period (gradual decalibration bias in a sensor, appearance of a new radiation source in the presence of a noisy background signal, wear out or buildup of a radial rub in rotating machinery, etc.). The system thus can alert the operator of the incipience or onset of the disturbance long before it would be apparent to visual inspection of strip chart or CRT signal traces, and well before conventional threshold limit checks would be tripped. This permits the operator to terminate, modify or avoid events that might otherwise challenge technical specification guidelines or availability goals. Thus, in many cases the operator can schedule corrective actions (sensor replacement or recalibration; component adjustment, alignment, or rebalancing; etc.) to be performed during a scheduled system outage.

Another important feature of the technique which distinguishes it from conventional methods is the built-in quantitative false-alarm and missed-alarm probabilities. This is quite important in the context of high-risk industrial processes and applications. The invention makes it possible to apply formal reliability analysis methods to an overall system comprising a network of interacting SPRT modules that are simultaneously monitoring a variety of plan variables. This amenability to formal reliability analysis methodology will, for example, greatly enhance the process of granting approval for nuclear-plant applications of the invention, a system that can potentially save a utility millions of dollars per year per reactor.

While preferred embodiments of the invention have been shown and described, it will be clear to those skilled in the art that various changes and modifications can be made without departing from the invention in its broader aspects as set forth in the claims provided hereinafter.

APPENDIX A cost.m    Computes the error between the network output for a hypothesized class and the network output for the presented signal.

35

```
function x=cost(params,signal,w,fnc,a,b,c)

m=size(signal,2);
p=size(w,2);

c_dilate=params(1)
d_shift=params(2)

h=change_h(c_dilate,d_shift,a,b,c,fnc,m);
y=wnn(signal,w,h)
target=[0.9];
x=target-y;
x=10-x*x';
%x=x*x';
return
```

APPENDIX B gsnn.m          Creates gaussian wavelet functions.

```
function y=gann(x,a,b,c);

K=length(a);
T=length(x);
X=x; A=a; B=b; C=c;

y=C*exp(-((X-B).^2)./(2*A.^2));
```

APPENDIX C change_n.m  Scales and translates the wavelet functions before creating the hh matrix using create_h.m.

39

```
function h=change_h(c_dilate,d_shift,a,b,c,fcn,T)

K=length(a);

for i=1:K,
    a(i)=a(i)*c_dilate;
    b(i)=c_dilate*b(i)+d_shift;
end h=create_h(a,b,c,fcn,T);
return
```

APPENDIX D wnn.m     Computes the network output for a given set of weights, w, and given product of signal and wavelet functions stored in hh.

```
                                        41
function [y,u]=wnn(x,w,hh);

P=size(w,2);    %%%%%  Each column in the matrix of weights (w)  %%%%%%%%%%
                %%%%%  correspondes to a connection to one        %%%%%%%%%%
                %%%%%  output node.                               %%%%%%%%%%
u=zeros(size(x,1),P);

for i=1:size(x,1)

u(i,:)=x(i,:)*hh*w;
        y(i,:)=1./(1+exp(-u(i,:)));
end
```

APPENDIX E create_n.m  Creates the product of the signal with the wavelet functions to give matrix hh.

43

```
function h=create_h(a,b,c,fcn,T);

K=length(a);
t=[1:T]';
h=zeros(T,K);
for i=1:K eval(['h(:,i)=' fcn '(t,a(i),b(i),c(i));']);
end
```

APPENDIX F trainwnn.n     This is the main driver routine to train the network. Training data is accepted as input and proceeds to compute network weights and wavelet parameters to force the network to reproduce training data target values corresponding to training data input patterns.

45

```
function [w,y,a,b,c,hh,www]=trainwnn(train,targ,a,b,c,its1,its2,epsi);

global w trn target fcn T;

% [W,y,a,b,c,h,wtime] = TRAINWNN(TRN,TARGET,a0,b0,c0,its);
%       This function is used to train the wavelet neural network
%       used in the function WNN() using an alternating minimization
%       technique that minimizes the network error w.r.t. the
%       wavelet parametrs and then finds a corresponding least
%       squares solution for the network weights.  This alternation
%       is repeated until the error is less then a user specified
%       Epsilon.
%
%       W       - (KxP) Matrix of network weights (where K is the
%                 number of Wavelet functions used and P is the
%                 number of output nodes).
%       y       - Oput of network after training. (to see how close
%                 the results are to the target).
%       a,b,c   - Parameters found for the wavelets.
%       h       - Matrix whose columns contain the wavelet functions.
%       wtime   - Matrix whose columns are the updated weights at each
%                 iteration.
%       TRN     - (LxT) Matrix containing the L training input data sets.
%       TARGET  - (LxP) Matrix containing the L training target outputs
%                 corresponding to the L training inputs.
%       a0,b0,c0 = (1xK) Vectors containing the initial wavelet parameters.
%                 (each element is for a different wavelet).
%       its1    - Maximum number of iterations allowed during the
%                 minimization step for finding the parameters of
%                 the wavelets.
%       its2    - Maximum number of iterations for the overall procedure.
%       epsi    - Value that sum(sum((TRAIN-TARGET).^2))^0.5 must be less
%                 to stop the procedure.

k=length(a);

trn=train;      %%%%%%% Global used in FMINS %%%%%%%
target=targ;    %%%%%%% Global used in FMINS %%%%%%%
[L,T]=size(trn);
[L,p]=size(target);
fprintf('\n\n\n Training the wavelet NN using alternating minimization....\n');
fprintf('    # of output nodes     = %d\n',p);
fprintf('    # of wavelets         = %d\n',k);
fprintf('    # of weights to find  = %d\n',k*p);
fprintf('    # of training inputs  = %d\n\n',L);
tic;

opt=0;
fcn='gsnn(';    %%%%%%%%% String used to call the GSNN function
                %%%%%%%%% used to create the wavelets using
                %%%%%%%%% gaussian functions.

u=log(target./(1-target));    %%%%%%% Calculating the input to the
                              %%%%%%% sigmoid function based on the
                              %%%%%%% desired target output.
cnt=0;
```

46

```
fprintf('       Starting main loop iteration number: ');
while(1)
        cnt=cnt+1;
        fprintf('%4.0d\b\b\b\b',cnt);

%%%%%%%   Solve the linear equation for the weights (w)   %%%%%%%%% hh=create_h(a,b,c,fcn,T);
        w=trn*hh\u;
        [y,u]=wnn(trn,w,hh);

www(:,cnt)=reshape(w,k*p,1);
        if (sum(sum((y-target).^2))^0.5 < epsi), break; end %%%%%%%   Minimize the error function with respect to a, b, and c %%%

OPTIONS(14)=its1;
        OPTIONS(1)=0;
        OPTIONS(7)=1;
        OPTIONS(2)=1*10^(-6);
        OPTIONS(3)=1*10^(-6);
        parms=[a(:);b(:)];
        [parms,OPT]=fmins('Ealt',parms,OPTIONS,[],c);
        opt=opt+OPT(10);

a=parms(1:k); b=parms(k+1:2*k);

hh=create_h(a,b,c,fcn,T);

[y,u]=wnn(trn,w,hh);
         y                                %%%%%%%%%%%%%%%%
         save out_trainwnn.mat;           %%%%%%%%%%%%%%%%
        if ((sum(sum((y-target).^2))^0.5)) < epsi, break; end
((sum(sum((y-target).^2))^0.5))%%%%%%%%%%%%%%%%%%%%%%%%%%%%%
        if(cnt>its2), break; end
end fprintf('\n\n   Finished!!  Time to complete = %f minutes\n\n',toc/60);
fprintf('              Total number of iterations = %d\n\n',cnt);
fprintf('              Total fmins iterations     = %d\n\n',opt);
```

APPENDIX G opti_view.m  This minimizes error between network output for the hypothesized class and network output for signal presented.

```
                                    48
function [c_dilate,d_shift]=opti_view(signal,w,fnc,a,b,c)

c_dilate=1;
d_shift=0;

% search with genetic algorithm
its1=1000;
OPTIONS(11:13)=[30 1 0];
%OPTIONS(11:13)=[100 1 0];
p=path;
path(p,'/home/flame2/stephan/MATLAB/OPTIMIZATION/genetic')
params=genetic('cost',[c_dilate d_shift], ...
               OPTIONS,[0.93 -10],[1.07 10],[36 36], ...
               signal,w,fnc,a,b,c);

%·search with gradient search algorithm
%OPTIONS(1)=0;
%OPTION(14)=500;
%params=fmins('cost',[c_dilate d_shift], ...
%             OPTIONS,[], ...
%             signal,w,fnc,a,b,c);

% shift and dilate reference signal this much to map into signal
% presented to network c_dilate=params(1)
d_shift=params(2)

% net output for shifted and dilated reference signal m=size(signal,2);
h=change_h(c_dilate,d_shift,a,b,c,fnc,m);
y=wnn(signal,w,h)

% shift and dilate to return signal in direction of that stored in net temp=ACCORDION(signal,fix(260/c_dilate),'spl');
temp=[zeros(1,100) temp zeros(1,100)];
[m,n]=size(temp);

if (d_shift > 0),
   temp=temp(d_shift+1:n);
   [m,n]=size(temp);
   temp=temp(101:n);
   temp=temp(1:260);
end if (d_shift < 0),
   temp=temp(101:n);
   temp=[zeros(1:abs(d_shift)) temp ];
   temp=temp(1:260);
end plot(temp)
hold return
```

49

APPENDIX H ealt.m   This computer the error between network output for the presented signal and the target network output.

```
function yy=Ealt(parms,c);

global w fcn T trn target;

NN=length(parms);

N=NN/2;
a=parms(1:N); b=parms(N+1:2*N);

h=create_h(a,b,c,fcn,T);

[y,u]=wnn(trn,w,h);

yy=sum(sum((target-y).^2))^0.5;
```

51

APPENDIX I perceptron.m This provides for additional shaping of the response surface beyond that capability inherent in whn.m, the wavelet network component of the neural network.

ff-train feed-forward conj-grad3.m line-min.m activation.m

```
% function [V, W, Emin, nepochs] = ff_train (train_set, rangeL, rangeU, ...
%           fL, fU, nin, phid, limits, gen_flag, conj_flag, print_flag)
%
% ff_train -- Driver function to train a feed forward method utilizing
% any of the conjugate gradient models developed or the back propagation
%     method (with eta = 0.25 and mu = 0.9).
%
%     The function returns:
%     V - the weights and biases for the connections between the
%         input and hidden nodes,
%     W - the weights and biases for the connections between the
%         hidden and output nodes,
%     Emin - the value of the error surface at the point in weight space
%         defined by V and W.
% function [V, W, Emin, nepochs] = ff_train (train_set, rangeL, rangeU, ...
         fL, fU, nin, phid, limits, gen_flag, conj_flag, print_flag)

% Set default values for function limits.
if ((conj_flag > 0) & (conj_flag < 4))
    if (length(limits) == 3)
        limits = [limits 1000];
    elseif (length(limits) == 2)
        limits = [limits 0 1000];
    elseif (length(limits) == 1)
        limits = [limits 0.001 0 1000];
    end
else
    if (length(limits) == 3)
        limits = [limits 10000];
    elseif (length(limits) == 2)
        limits = [limits 0.9 10000];
    elseif (length(limits) == 1)
        limits = [limits 0.25 0.9 10000];
    end
end initparm = 'NgW'; wtsize = 0.1;

% Print switches if print_flag is in debug mode
if (print_flag==2)
    fprintf('nin=%3.0f; phid=%3.0f; \n', nin, phid)
    fprintf('fU=%5.3f; fL=%5.3f; \n ', fU, fL)
    fprintf('limits: %5.3f %5.3f %5.3f %5.3f\n', limits)
end % Evaluate the number of training examples and the number of columns in
% train_set.
[pexam, ncols] = size(train_set);
mout = ncols-nin-1;         % Number of outputs % Extract the time stamp from the raw data.
time = train_set(:,1);

% Create data array to hold transformed data.
data = zeros (pexam, ncols-1);
```

53

```
% Normalize data from range0 - rangeL to f0 - fL.
for i = 1:ncols-1
    slope = (f0-fL) / (rangeU(1,i) - rangeL(1,i));
    data(:,i) = slope*train_set(:,i+1) + fL - slope*rangeL(1,i);
end X=data(:,1:nin);                  % Create input data array.
T=data(:,nin+1:nin+mout);         % Create training data array.
Y = zeros(size(T));
D = zeros(size(T));

if (print_flag==2)
    fprintf ('\n\n Training Data Set:\n ');
    disp (train_set);
    fprintf ('\n\n Transformed Input Data:\n');
    disp (X);
    fprintf ('\n\n Transformed Target Data:\n');
    disp (T);
    % disp('Press (almost any) key to continue'), pause
end % Randomize
randomiz;
[V, BiasV] = bpninit1(phid, nin, initparm);
V = [V'; BiasV']
W = wtsize*(2.*rand(phid,mout)-1.);
BiasW = wtsize*(2.*rand(1,mout)-1.);
W = [W; BiasW]

% Call the gen_init to optimize the initial weight values using the
% simple genetic algorithm routine.
if (gen_flag > 0)
    if (gen_flag == 1)
        bits = 8; options = [15 1 0 50];
    elseif (gen_flag == 2)
        bits = 8; options = [15 1 0.001 50];
    elseif (gen_flag == 3)
        bits = 8; options = [30 1 0 50];
    elseif (gen_flag == 4)
        bits = 8; options = [30 1 0.001 50];
    elseif (gen_flag == 5)
        bits = 16; options = [30 1 0 50];
    else
        bits = 16; options = [30 1 0.001 50];
    end
    vlb = -100; vub = 100;
    if (print_flag == 1)
        fprintf ('\n\n Initial weights are being optimized with a simple ')
        fprintf ('genetic algorithm.\n\n')
    end
    % Call gen_init to optimize the initial weights.
    [V, W] = gen_init (V, W, X, T, vlb, vub, bits, options, print_flag);
end % Print debug output if print_flag == 2.
if (print_flag==2)
    fprintf ('\n\n Initial weights and biases:\n'); V, W
    % disp('Press (almost any) key to continue'), pause
end
```

54

```
% Call training model to find the minimum of line the error surface.
if (print_flag == 1)
    if ((conj_flag > 0) & (conj_flag < 4))
        fprintf ('\n\n Training network with conjugate gradient ')
        fprintf ('method #%1.0f:', conj_flag)
    else
        fprintf ('\n\n Training network with back propagation method:')
    end
end
if (conj_flag == 1)
    [V, W, Emin, nepochs] = conj_grad (V, W, X, T, limits, print_flag);
elseif (conj_flag == 2)
    [V, W, Emin, nepochs] = conj_grad2 (V, W, X, T, limits, print_flag);
elseif (conj_flag == 3)
    [V, W, Emin, nepochs] = conj_grad3 (V, W, X, T, limits, print_flag);
else
    [V, W, Emin, nepochs] = back_prop (V, W, X, T, limits, print_flag);
end if (print_flag == 2)
    fprintf ('\n\n Line-Minimized Weights:\n'); V, W
    fprintf ('\n\n Minimized Error and Number of Epochs:\n');
    disp(Emin); disp(nepochs);
    % disp('Press (almost any) key to continue'), pause
end
```

What is claimed is:

1. A method of performing surveillance of transient signals of an industrial device to determine an operating state thereof, comprising the steps of:
   (a) reading into a memory training data;
   (b) determining neural network weighting values by the steps comprising:
      (1) solving a set of linear equations for obtaining the neural network weighting values;
      (2) computing a neural network output;
      (3) evaluating the neural network output to determine whether the output is close to a set of target outputs;
      (4) continuing steps (1)–(3) until achieving the target outputs; and
      (5) providing a neural network output;
   (c) providing signals characteristic of an industrial process;
   (d) comprising the neural network output to said industrial process signals to ascertain the operating state of the industrial process comprising the steps of:
      (1) hypothesizing said industrial process signals belong to a particular class;
      (2) at least one of translating and scaling stored neural network training signals: and
      (3) determining error between the neural network output for said industrial process signals and said stored neural network training signals.

2. The method as defined in claim 1 further includes additional steps after said step (b) when the target outputs are not sufficiently close to the target outputs, said steps comprised of:
   commencing iterating on wavelet parameters; and
   calculating the neural network output for the wavelet parameters until achieving a desired set of the wavelet parameters such that the network output converges to the desired set of target outputs.

3. The method as defined in claim 1 wherein the network weighting values are adjusted to enable meeting the target outputs by minimizing an error equation given by:

$$E = \sum_{p=1}^{P} \frac{1}{2} \sum_{l=1}^{L} (t_{pl} - o_{pl})^2$$

where $t_{pl}$=target value at $p^{th}$ output mode when input signal 1 is presented to the neural network.

4. The method as defined in claim 1 wherein n potential classes exist and the industrial process signals are tested n times to determine the proper class for the process signals.

5. The method as defined in claim 1 where output values $u_{pl}$ of the neural network are given in terms of the weighting values $w_{kp}$, and coefficients thereof including $a_k$, $b_k$ and $c_k$ as follows:

$$u_{pl} = \sum_{k=1}^{k} w_{kp} \sum_{t=1}^{T} i_1(t) c_k h \left( \frac{t - b_k}{a_k} \right)$$

where $i_1(t)$=value of input signal 1 at time t.

6. The method as defined in claim 5 wherein a defined best set of $w_{kp}$ values is found by least squares followed by applying a gradient descent method to determine the values of said $a_k$, $b_k$ and $c_k$.

7. The method as defined in claim 1 wherein the industrial process signals comprise biological signals.

8. The method as defined in claim 7 wherein the biological signals comprise heart signals.

9. The method as defined in claim 1 wherein the industrial process signals comprise signals having substantially constant signals either side thereof characteristic of equilibrium signals for the industrial process.

10. The method as defined in claim 9 wherein further including the step of determining onset of equilibrium signals from the industrial process and implementation of a SPRT analysis.

11. The method as defined in claim 1 wherein said step (b) comprises training on translated and scaled versions of the training data.

12. The method as defined in claim 11 wherein the training process includes setting the target outputs lower, thereby establishing a gradient.

13. The method as defined in claim 11 wherein a cartesian coordinate system is established with an original signal at point (0,1), a first axis corresponding to a translate dimension and a second axis corresponding to a scale dimension and said training data establishing a well-shaped response surface, thereby enabling evaluation of a presented signal to determine whether it is a member of the same class as the training data.

14. The method as defined in claim 13 wherein the output of the network is input to a two layer perceptron network thereby providing additional degrees of freedom for enhanced shaping of the response surface.

15. The method as defined in claim 13 wherein error between the training data and the presented signal is least for the class to which it belongs.

16. The method as defined in claim 13 wherein a genetic search method is used to find a global extremum in said response surface.

17. A method of performing surveillance of transient signals of an industrial device to determine an operating state thereof, comprising the steps of:
   (a) reading into a memory training data;
   (b) determining neural network weighting values by the steps comprising:
      (1) solving a set of linear equations for obtaining the neural network weighting values;
      (2) computing a neural network output;
      (3) evaluating the neural network output to determine whether the output is close to a set of target outputs;
      (4) continuing steps (1)–(3) until achieving the target outputs; and
      (5) providing a neural network output;
   (c) providing signals characteristic of an industrial process;
   (d) calculating the neural network output for the wavelet parameters until achieving a desired set of the wavelet parameters which yield the neural network output close to a desired set of target outputs by performing the following steps:
      (1) hypothesizing said industrial process signals belong to a particular class;
      (2) translating and scaling stored neural network training signals; and
      (3) determining error between the neural network output for said industrial process signals and said stored neural network training signals.
   (e) providing signals characteristic of an industrial process;
   (f) comparing the neural network output to said industrial process signals to ascertain the operating state of the industrial process.

18. The method as defined in claim 17 wherein the industrial process signals comprise transient signals.

19. The method as defined in claim 17 further including the step of annunciating an alarm condition upon detecting a deviation of the industrial process signals from a desired one of the particular class.

20. The method as defined in claim 17 wherein said industrial process signals are selected from the group consisting of engine startup signals, biological pulse signals, chemical process startup signals, power plant startup signals and electronic systems transient signals.

* * * * *

UNITED STATES PATENT AND TRADEMARK OFFICE
CERTIFICATE OF CORRECTION

PATENT NO. : 5,745,382
DATED : April 28, 1998
INVENTOR(S) : Richard B. Vilim et al.

It is certified that error appears in the above-identified patent and that said Letters Patent is hereby corrected as shown below:

Column 5,
Line 13, delete "basis" and insert -- basic --.
Line 36, delete "$W_{kp} = K_{th}$" and insert -- $W_{kp} = K^{th}$ --

Column 11,
Line 23, delete "copending application of the assignee" and insert -- issued patent belonging to ARCH Development Corp. --

Column 13,
Line 25, delete "$Y_1 = \frac{a_0}{2} + \sum_{m=1}^{\frac{N}{2}} (a_m \cos \omega_m t)$" and insert -- $Y_t = \frac{a_0}{2} + \sum_{m=1}^{\frac{N}{2}} (a_m \cos \omega_m t)$ --.

Column 15,
Line 35, delete "214" and inert -- $2^{14}$ --

Column 16,
Line 6, delete "Figs 13" and insert -- Figs 13 A-D and 14 A-D --

Column 17,
Line 16, delete "a" and insert -- $\alpha$ --

Column 61,
Line 18, delete "comprising" and insert -- comparing --

Signed and Sealed this

Eighth Day of January, 2002

*Attest:*

*Attesting Officer*

JAMES E. ROGAN
*Director of the United States Patent and Trademark Office*